(12) United States Patent
Piemonte et al.

(10) Patent No.: US 9,529,440 B2
(45) Date of Patent: Dec. 27, 2016

(54) DISAMBIGUATION OF MULTITOUCH GESTURE RECOGNITION FOR 3D INTERACTION

(71) Applicant: Apple Inc., Cupertino, CA (US)

(72) Inventors: Patrick S. Piemonte, San Francisco, CA (US); Bradford A. Moore, San Francisco, CA (US); Billy P. Chen, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 94 days.

(21) Appl. No.: 13/942,369

(22) Filed: Jul. 15, 2013

(65) Prior Publication Data

US 2014/0019917 A1   Jan. 16, 2014

Related U.S. Application Data

(60) Provisional application No. 61/671,774, filed on Jul. 15, 2012.

(51) Int. Cl.
| | | |
|---|---|---|
| *G06F 3/0481* | (2013.01) | |
| *G06F 3/01* | (2006.01) | |
| *G06F 3/0484* | (2013.01) | |
| *G06F 3/0488* | (2013.01) | |

(52) U.S. Cl.
CPC ........... *G06F 3/017* (2013.01); *G06F 3/04815* (2013.01); *G06F 3/04845* (2013.01); *G06F 3/04883* (2013.01)

(58) Field of Classification Search
CPC .............. G06F 3/04883; G06F 3/04815; G06F 3/04845; G06F 3/017; G06F 2203/0408; G06F 2203/04806

USPC .......................................... 715/849, 863, 964
See application file for complete search history.

(56) References Cited

U.S. PATENT DOCUMENTS

| | | | |
|---|---|---|---|
| 6,323,846 B1 | 11/2001 | Westerman | |
| 7,469,381 B2 | 12/2008 | Ording | |
| 7,479,949 B2 | 1/2009 | Jobs et al. | |
| 7,907,124 B2 * | 3/2011 | Hillis et al. | 345/173 |

(Continued)

FOREIGN PATENT DOCUMENTS

| | | |
|---|---|---|
| CN | 101452356 A | 6/2009 |
| CN | 101968695 A | 2/2011 |

(Continued)

OTHER PUBLICATIONS

International Search Report and Written Opinion for International PCT Application No. PCT/US2013/050454, mailed Oct. 30, 2013, 9 pages.

(Continued)

*Primary Examiner* — Andrew Tank
(74) *Attorney, Agent, or Firm* — Morgan, Lewis & Bockius LLP

(57) ABSTRACT

A multitouch device can interpret and disambiguate different gestures related to manipulating a displayed image of a 3D object, scene, or region. Examples of manipulations include pan, zoom, rotation, and tilt. The device can define a number of manipulation modes, including one or more single-control modes such as a pan mode, a zoom mode, a rotate mode, and/or a tilt mode. The manipulation modes can also include one or more multi-control modes, such as a pan/zoom/rotate mode that allows multiple parameters to be modified simultaneously.

15 Claims, 12 Drawing Sheets

(56) References Cited

U.S. PATENT DOCUMENTS

| | | | |
|---|---|---|---|
| 8,269,729 B2* | 9/2012 | Han et al. | 345/173 |
| 8,274,534 B2* | 9/2012 | Montague | 345/661 |
| 8,799,821 B1* | 8/2014 | De Rose et al. | 715/848 |
| 2006/0026521 A1* | 2/2006 | Hotelling | G06F 3/0418 715/702 |
| 2008/0036743 A1 | 2/2008 | Westerman et al. | |
| 2008/0309632 A1 | 12/2008 | Westerman et al. | |
| 2009/0146968 A1 | 6/2009 | Narita et al. | |
| 2010/0045666 A1 | 2/2010 | Kornmann et al. | |
| 2010/0110025 A1 | 5/2010 | Lim | |
| 2011/0018827 A1 | 1/2011 | Wang et al. | |
| 2011/0117537 A1 | 5/2011 | Funada | |
| 2011/0316884 A1* | 12/2011 | Giambalvo et al. | 345/660 |
| 2011/0316888 A1* | 12/2011 | Sachs et al. | 345/667 |
| 2012/0068950 A1 | 3/2012 | Conde et al. | |
| 2013/0086517 A1* | 4/2013 | Van Lancker et al. | 715/800 |
| 2013/0169579 A1 | 7/2013 | Havnor | |

FOREIGN PATENT DOCUMENTS

| | | |
|---|---|---|
| EP | 1615109 A2 | 1/2006 |
| EP | 1 621 989 A2 | 2/2006 |
| EP | 2 068 235 A2 | 6/2009 |
| EP | 2 280 339 A1 | 2/2011 |
| EP | 2354930 A1 | 8/2011 |
| EP | 2 602 706 A2 | 6/2013 |
| JP | 2005-303870 A | 10/2005 |
| JP | 2008-508600 A | 3/2008 |
| JP | 2009-140368 A | 6/2009 |
| JP | 2010-122767 A | 6/2010 |
| JP | 2011-028560 A | 2/2011 |
| JP | 2011-059952 A | 3/2011 |
| WO | 2009/026553 A1 | 2/2009 |
| WO | WO 2010/010654 A1 | 1/2010 |
| WO | WO 2012/007745 A2 | 1/2012 |

OTHER PUBLICATIONS

Office Action, dated Jul. 27, 2015, received in Australian Patent Application No. 2013290495, which corresponds with U.S. Appl. No. 13/942,369, 3 pages.

Office Action, dated Mar. 2, 2016, received in Korean Patent Application No. 10-2015-7003662, which corresponds with U.S. Appl. No. 13/942,369, 5 pages.

International Preliminary Report on Patentability, dated Jan. 20, 2015, received in International Patent Application No. PCT/US2013,050454, which corresponds with U.S. Appl. No. 13/942,369, 6 pages.

Notice of Allowance, dated Jun. 28, 2016, received in Australian Patent Application No. 2013290495, which corresponds with U.S. Appl. No. 13/942,369, 2 pages.

* cited by examiner

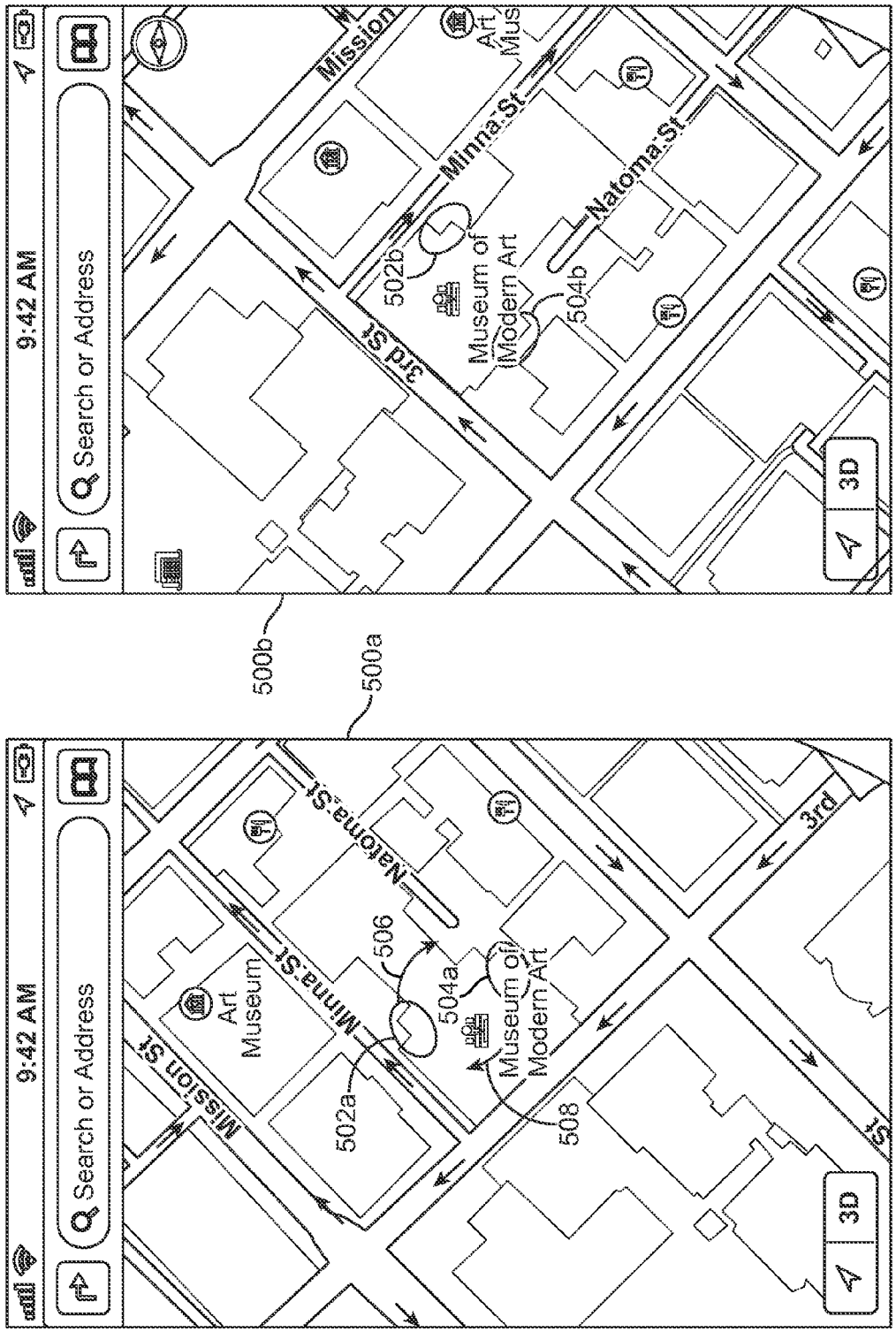

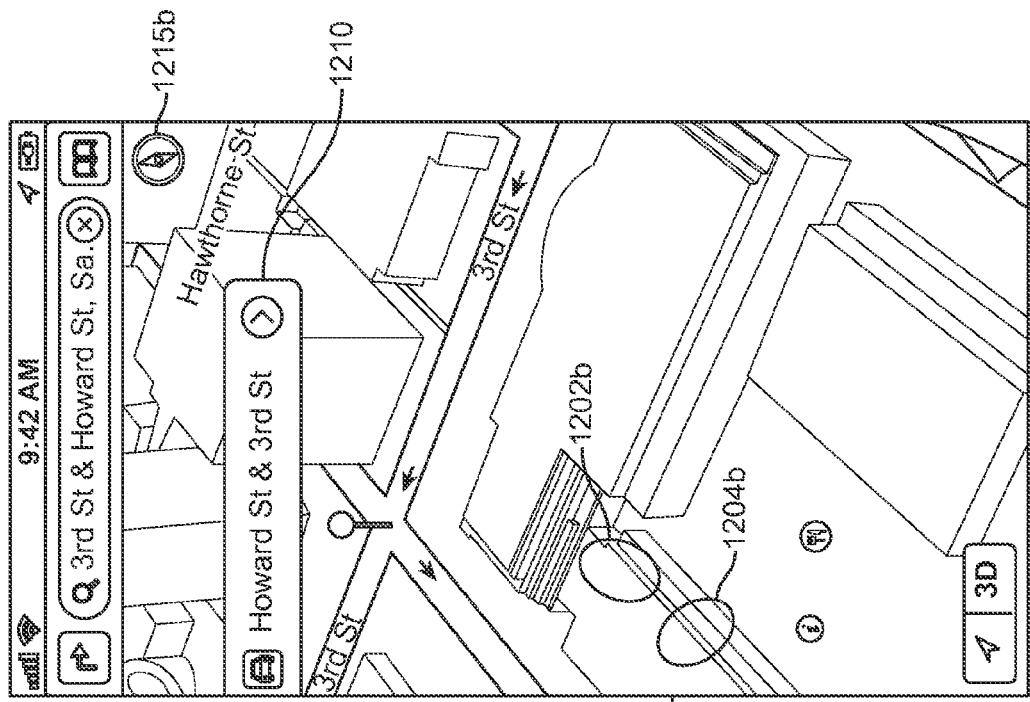
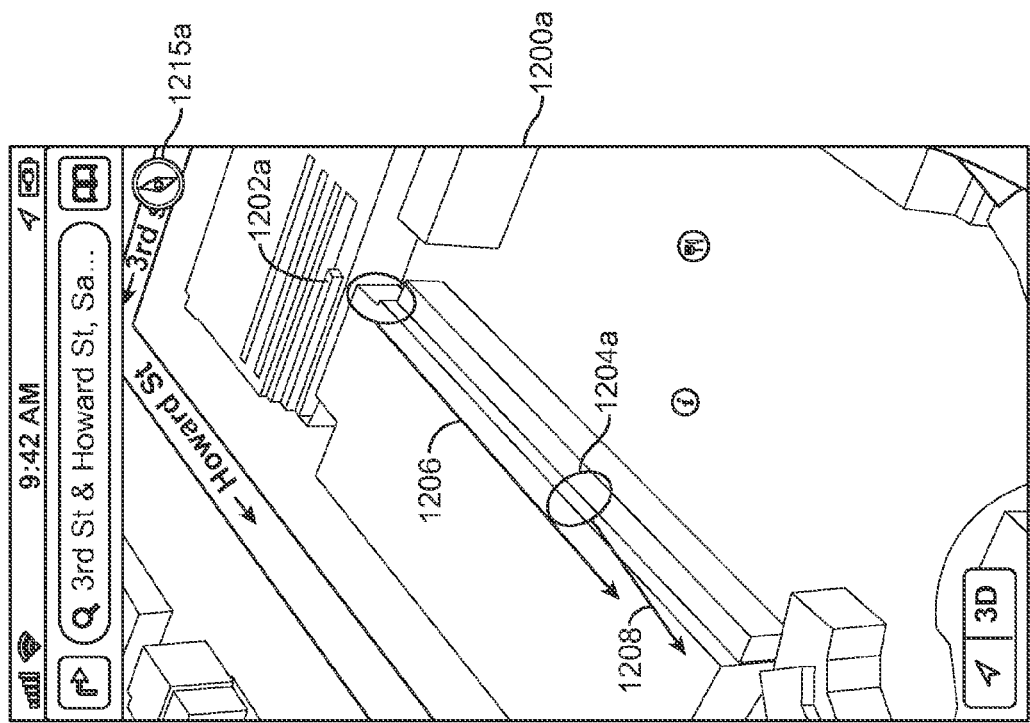
FIG. 12B
FIG. 12A

DISAMBIGUATION OF MULTITOUCH GESTURE RECOGNITION FOR 3D INTERACTION

CROSS-REFERENCES TO RELATED APPLICATIONS

This application is a non-provisional of U.S. Provisional Application No. 61/671,774, filed Jul. 15, 2012, the disclosure of which is incorporated by reference in its entirety.

The present application is related to the following U.S. Patents and Applications: U.S. Pat. No. 6,326,846, issued Nov. 27, 2001 (application Ser. No. 09/236,513, filed Jan. 25, 1999); U.S. Pat. No. 7,469,381, issued Dec. 23, 2008 (application Ser. No. 11/956,969, filed Dec. 14, 2007); U.S. Pat. No. 7,479,949, issued Jan. 20, 2009 (application Ser. No. 12/101,832, filed Apr. 11, 2008); and U.S. patent application Ser. No. 11/700,636, filed Jan. 31, 2007. The respective disclosures of these patents and applications are incorporated herein by reference in their entirety.

BACKGROUND

The present disclosure relates generally to multitouch gesture recognition and in particular to disambiguation of multitouch gesture recognition for three-dimensional (3D) interaction.

Multitouch devices allow users to interact with displayed information using gestures that are typically made by touching a touch-sensitive surface with one or more fingers or other contact objects such as a stylus. The number of contact points and the motion of the contact point(s) are detected by the multitouch device and interpreted as a gesture, in response to which the device can perform various actions.

SUMMARY

In accordance with certain embodiments of the present invention, a multitouch device can intelligently interpret and disambiguate different gestures related to a displayed image of a 3D object, scene, or region. For example, when interacting with a displayed image depicting a 3D region (such as a map), the user may want to pan the image to see a different portion of the region, zoom in or out to see greater detail or a larger portion of the region, and/or rotate or tilt the image to view the region from different angles. At different times, the user may want to make a single adjustment or to freely adjust multiple viewing parameters at once, e.g., zooming while panning or rotating. The multitouch device can include a sensor to detect the user's gestures and interpretation logic (e.g., implemented in software executing on a programmable processor, dedicated circuitry, or a combination thereof) to translate a detected gesture into one or more commands to modify a displayed image.

In some embodiments, the interpretation logic can select a manipulation mode for an image based on an initial gestural motion performed by the user, and image-manipulation commands can be generated based on interpreting the gesture (including the initial gesture and subsequent motion). The image manipulation commands can be executed by the device to manipulate the image, e.g., by changing parameters defining a viewing location, viewing direction and/or viewing angles for a virtual camera. For example, the manipulation modes can include one or more single-control modes such as a pan mode to modify a viewing location, a zoom mode to modify image magnification (or to move the virtual camera closer to or farther from the object or region being viewed), a rotation mode to orient the virtual camera in a different direction, and/or a tilt mode to adjust a tilt angle associated with the virtual camera. The manipulation modes can also include one or more multi-control modes, such as a pan/zoom/rotate mode that allows multiple parameters to be modified simultaneously.

The following detailed description together with the accompanying drawings will provide a better understanding of the nature and advantages of the present invention.

BRIEF DESCRIPTION OF THE DRAWINGS

FIGS. 5A and 5B illustrate a rotate gesture according to an embodiment of the present invention.

FIGS. 12A and 12B illustrate a multi-control manipulation according to an embodiment of the present invention.

DETAILED DESCRIPTION

This application includes and incorporates the following patents and publications as part of the Detailed Description:
Westerman et al., U.S. Pat. No. 6,326,846, issued Nov. 27, 2001;
Ording, U.S. Pat. No. 7,469,381, issued Dec. 23, 2008;
Jobs et al., U.S. Pat. No. 7,479,949, issued Jan. 20, 2009; and
Westerman et al., U.S. Patent App. Pub. No. 2008/0036743, published Feb. 14, 2008 (application Ser. No. 11/700,636, filed Jan. 31, 2007).

In accordance with certain embodiments of the present invention, a multitouch device can intelligently interpret and disambiguate different gestures related to a displayed image of a 3D object, scene, or region. For example, when interacting with a displayed image depicting a 3D region (such as a map), the user may want to pan the image to see a different portion of the region, zoom in or out to see greater detail or a larger portion of the region, and/or rotate or tilt the image to view the region from different angles. At different times, the user may want to make a single adjustment or to freely adjust multiple viewing parameters at once, e.g., zooming while panning or rotating. The multitouch device can include a sensor to detect the user's gestures and interpretation logic (e.g., implemented in software executing on a programmable processor, dedicated circuitry, or a combination thereof) to translate a detected gesture into one or more commands to modify a displayed image.

In some embodiments, the interpretation logic can select a manipulation mode for an image based on an initial gestural motion performed by the user, and image-manipulation commands can be generated based on interpreting the gesture (including the initial gesture and subsequent motion). The image manipulation commands can be executed by the device to manipulate the image, e.g., by changing parameters defining a viewing location, viewing direction and/or viewing angles for a virtual camera. For example, the manipulation modes can include one or more single-control modes such as a pan mode to modify a viewing location, a zoom mode to modify image magnification (or to move the virtual camera closer to or farther from the object or region being viewed), a rotation mode to orient the virtual camera in a different direction, and/or a tilt mode to adjust a tilt angle associated with the virtual camera. The manipulation modes can also include one or more multi-control modes, such as a pan/zoom/rotate mode that allows multiple parameters to be modified simultaneously.

I. Multitouch Disambiguation System

Figure 1:
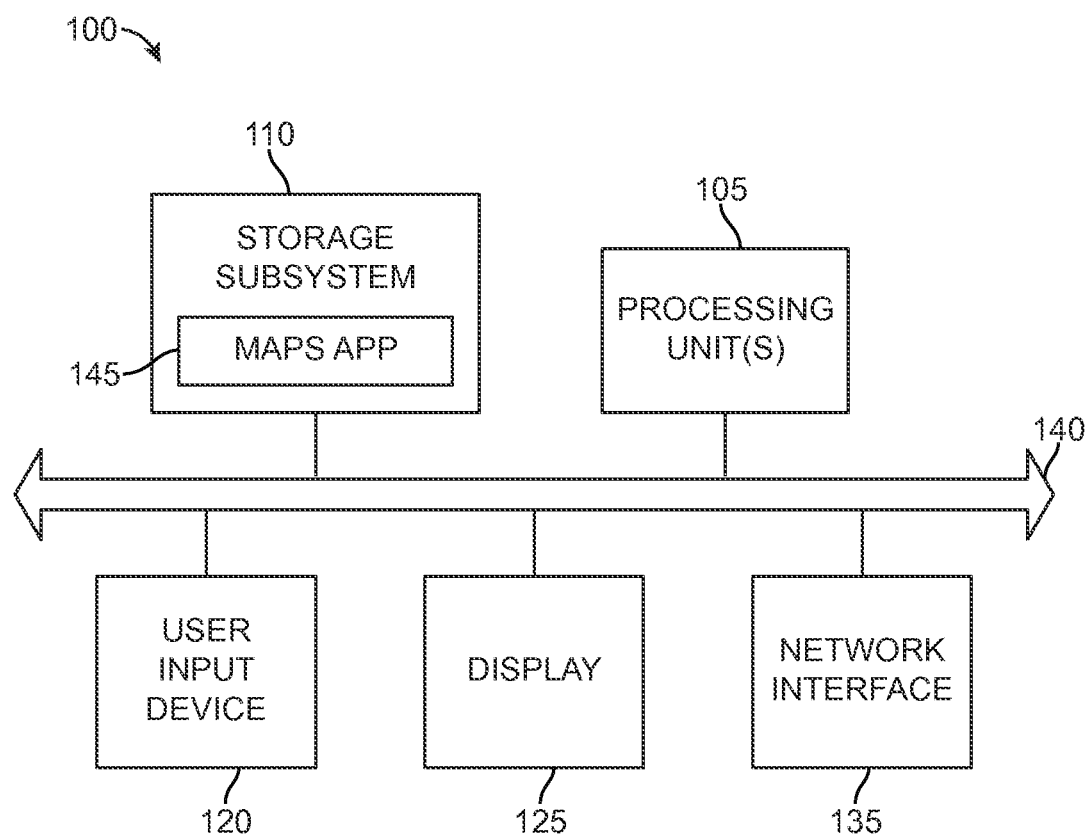
FIG. 1 illustrates a computer system according to an embodiment of the present invention.

FIG. 1 illustrates a computer system 100 according to an embodiment of the present invention. Computer system 100 can be implemented as any of various computing devices having a variety of form factors, including, e.g., a desktop or laptop computer, tablet computer, smart phone, in-vehicle navigation system, personal data assistant (PDA), or any other type of computing device, not limited to any particular form factor. Computer system 100 can include processing unit(s) 105, storage subsystem 110, input devices 120, display 125, network interface 135, and bus 140.

Processing unit(s) 105 can include a single processor, which can have one or more cores, or multiple processors. In some embodiments, processing unit(s) 105 can include a general-purpose primary processor as well as one or more special-purpose co-processors such as graphics processors, digital signal processors, or the like. In some embodiments, some or all processing units 105 can be implemented using customized circuits, such as application-specific integrated circuits (ASICs) or field programmable gate arrays (FPGAs). In some embodiments, such integrated circuits execute instructions that are stored on the circuit itself. In other embodiments, processing unit(s) 105 can execute instructions stored in storage subsystem 110.

Storage subsystem 110 can include various memory units such as a system memory, a read-only memory (ROM), and a persistent storage device. A ROM can store static data and instructions that are used by processing unit(s) 105 and other modules of electronic device 100. A persistent storage device can be a non-volatile readable and writable memory unit that stores instructions and data even when computer system 100 is powered down. System memory can be implemented using volatile read-and-write memory, such as dynamic random access memory, or non-volatile memory as desired. The system memory can store some or all of the instructions and data that are currently in use by processing unit(s) 105.

Storage subsystem 110 or units thereof can be implemented using any combination of computer-readable storage media including semiconductor memory chips of various types (DRAM, SRAM, SDRAM, flash memory, programmable ROM) and so on. Magnetic and/or optical disks can also be used. In some embodiments, storage subsystem 110 can include removable storage media that can be readable and/or writeable; examples of such media include compact discs (CD), read-only digital versatile discs (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic "floppy" disks, and so on. The computer-readable storage media do not include carrier waves and transitory electronic signals passing wirelessly or over wired connections.

In some embodiments, storage subsystem 110 can store one or more software programs to be executed by processing unit(s) 105, such as a maps application 145. "Software" refers generally to sequences of instructions that, when executed by processing unit(s) 105, cause computer system 100 to perform various operations, thus defining one or more specific machine implementations that execute and perform the operations of the software programs. The instructions can be stored as firmware residing in read-only memory and/or applications stored in magnetic storage that can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 110, processing unit(s) 105 can retrieve program instructions to execute and data to process in order to execute various operations described herein.

A user interface can be provided by one or more user input devices 120, display device 125, and/or and one or more other user output devices (not shown). Input devices 120 can include any device via which a user can provide signals to computing system 100; computing system 100 can interpret the signals as indicative of particular user requests or information. In various embodiments, input devices 120 can include any or all of a keyboard, touch pad, touch screen, mouse or other pointing device, scroll wheel, click wheel, dial, button, switch, keypad, microphone, and so on. In embodiments that incorporate gesture recognition, at least one input device 120 can provide a touch-sensitive surface capable of detecting location and motion of multiple distinct contact areas. Examples are described in U.S. Pat. No. 6,326,846 and U.S. Pat. No. 7,479,949; however, it is to be understood that a particular implementation of a touch-sensitive surface is not required.

Display 125 can display images generated by electronic device 100 and can include various image generation technologies, e.g., a cathode ray tube (CRT), liquid crystal display (LCD), light-emitting diode (LED) including organic light-emitting diodes (OLED), projection system, or the like, together with supporting electronics (e.g., digital-to-analog or analog-to-digital converters, signal processors, or the like). Some embodiments can include a device such as a touchscreen (e.g., a touch-sensitive overlay over an LCD, LED, or OLED display) that functions as both touch-sensitive input device and display device. In embodiments where the display is not touch-sensitive, a separate touch-sensitive surface can be provided to facilitate gesture-based input.

In some embodiments, other user output devices can be provided in addition to or instead of display 125. Examples include indicator lights, speakers, tactile "display" devices, printers, and so on.

In some embodiments, the user interface can provide a graphical user interface, in which visible image elements in certain areas of display 125 are defined as active elements or control elements that the user selects using user input devices 120. For example, the user can manipulate a user input device (e.g., a mouse or track pad) to position an on-screen cursor or pointer over the control element, then click a button or tap a touch-sensitive surface to indicate the selection. Alternatively, the user can touch the control element (e.g., with a finger or stylus) on a touchscreen device. In some embodiments, the user can speak one or more words associated with the control element (the word can be, e.g., a label on the element or a function associated with the element). In some embodiments, user gestures on a touch-sensitive device can be recognized and interpreted as input commands; these gestures can be, but need not be, associated with any particular array in display 125. Other user interfaces can also be implemented.

Network interface 135 can provide voice and/or data communication capability for electronic device 100. In some embodiments, network interface 135 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments, network interface 135 can provide wired network connectivity (e.g., Ethernet) in addition to or instead of a wireless interface. Network interface 135 can be implemented using a combination of hardware (e.g., antennas, modulators/demodulators, encoders/decoders, and other analog and/or digital signal processing circuits) and software components.

Bus 140 can include various system, peripheral, and chipset buses that communicatively connect the numerous internal devices of electronic device 100. For example, bus 140 can communicatively couple processing unit(s) 105 with storage subsystem 110. Bus 140 also connects to input devices 120 and display 125. Bus 140 also couples electronic device 100 to a network through network interface 135. In this manner, electronic device 100 can be a part of a network of multiple computer systems (e.g., a local area network (LAN), a wide area network (WAN), an Intranet, or a network of networks, such as the Internet. Any or all components of electronic device 100 can be used in conjunction with the invention.

Some embodiments include electronic components, such as microprocessors, storage and memory that store computer program instructions in a computer-readable storage medium. Many of the features described in this specification can be implemented as processes that are specified as a set of program instructions encoded on a computer-readable storage medium. When these program instructions are executed by one or more processing units, they cause the processing unit(s) to perform various operations indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 105 can provide various functionality for electronic device 100. For example, processing unit(s) 105 can execute maps application 145. Maps application 145 can provide various functionality such as the ability to display a map of a given region. The displayed region can be all or part of a "mapped" region for which map data is available. Map data can be stored locally, e.g., in storage subsystem 110, or stored remotely and obtained as needed, e.g., via network interface 135. In various embodiments, the mapped region can represent a portion of (or all of) Earth's surface, the surface of another planet or celestial body, a region of space, or a fictional region (e.g., a region created by an artist), and, at any given time, maps application 145 may display any portion (e.g., up to all) of the mapped region. The map can be rendered as a schematic model (e.g., a line drawing), as a photorealistic model (e.g., created from satellite, aerial, and/or ground-level photos or detailed artist renderings), or as a hybrid of the two (e.g., with schematic roads overlaid on a photorealistic image).

At any given time, maps application 145 can display an image of some portion (or all) of the mapped region. For example, the displayed region can be selected based on the current location of the device and/or on user input identifying a region of interest. The displayed region can be dynamically updated, e.g., based on user input and/or in response to changes in the position (location and/or orientation) of computing system 100.

It will be appreciated that computer system 100 is illustrative and that variations and modifications are possible. Computer system 100 can have other capabilities not specifically described here (e.g., mobile phone, global positioning system (GPS), power management, one or more cameras, various connection ports for connecting external devices or accessories, etc.). Further, while computer system 100 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Figure 2:
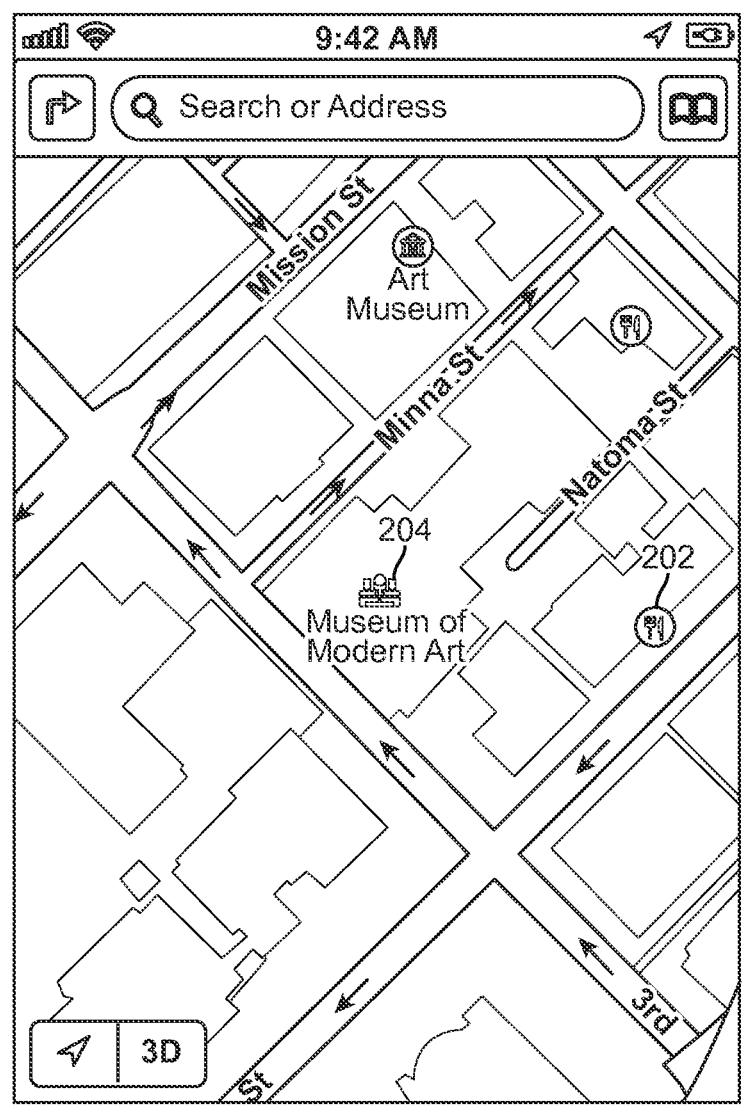
FIG. 2 illustrates a map that can be displayed on an electronic device according to an embodiment of the present invention.

FIG. 2 illustrates a map 200 that can be displayed on an electronic device (e.g., computer system 100 executing maps application 145) according to an embodiment of the present invention. Map 200 shows a region sized to fit the display. In this example, map 200 can be a 3D map that can be viewed from different angles, not limited to directly overhead, and a user can perform gestures to manipulate the view. In some embodiments, map 200 can be switched between 2D and 3D modes.

The displayed map can be manipulated by the user. In some embodiments, the map to be displayed is rendered, based on parameters defining the location and orientation of a virtual camera in 3D space. In response to gestural input from a user, commands can be executed to modify the parameters, thereby repositioning the camera (i.e., changing location and/or orientation), and the map can be re-rendered with the new camera parameters. For example, the map can be panned by translating the virtual camera in a plane parallel to a ground plane of the map, allowing different areas to be viewed. The map can be zoomed by translating the virtual camera along its optical axis closer to or farther from the ground plane (or by changing a focal length or magnification factor associated with the virtual camera without moving it), allowing the area in view to be enlarged or reduced. The map can be rotated by changing the orientation of the virtual camera's optical axis and/or "up" vector. The map can be tilted by repositioning the virtual camera to change a "tilt" angle between the optical axis and the ground plane of the map. Examples of gestures that can be used to execute such manipulations are described below.

In some embodiments, the displayed map can also be operative as an interface to allow a user to access additional information. For example, the user can tap on a location (e.g., a restaurant 202 or a museum 204) marked on the map to obtain more information about that location (e.g., an establishment's phone number, operating hours, products and services offered, customer reviews and feedback, etc.). Other location-related information may also be available, such as current or predicted weather conditions, upcoming events, turn-by-turn directions for navigating to the location, parking availability, and the like.

Although FIG. 2 and other figures illustrate a map image, depending on implementation, the image can be, for instance, a model of an object generated by a computer-aided design (CAD) program, a rendering of an image of a scene containing real and/or computer-generated objects, or any other image of a real or virtual 3D region.

II. Single-Control Modes

Examples of gestures that can be used to manipulate a displayed map (or other image) will now be described. In these examples, a gesture is defined based on a number of contacts and motion of the contacts on a touch-sensitive surface. In some embodiments, the number of contacts shown is treated as a minimum number and any extra contacts are ignored.

Figure 3B:
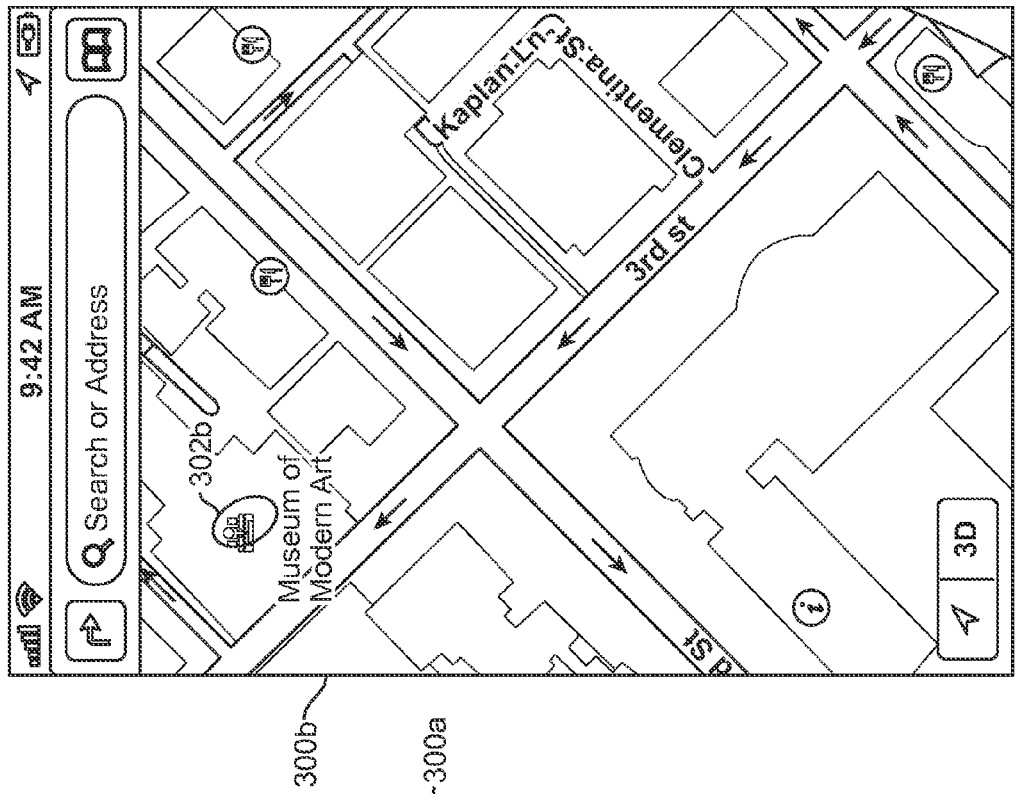
FIGS. 3A and 3B illustrate a pan gesture according to an embodiment of the present invention.
Figure 3A:
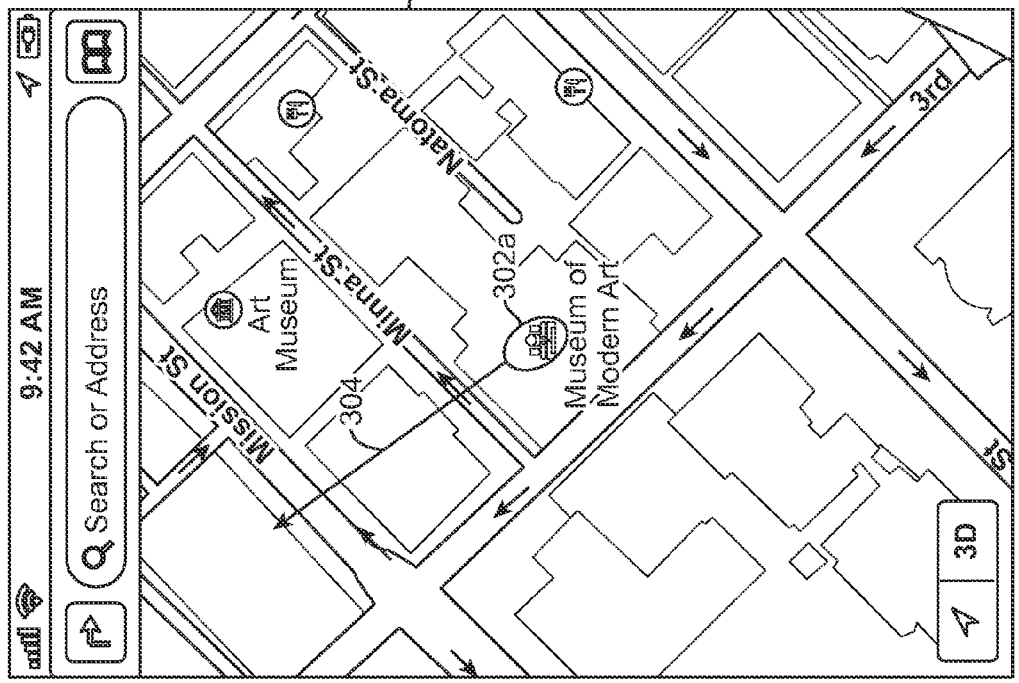

FIGS. 3A and 3B illustrate a "pan" gesture that causes the electronic device to shift, or translate, the visible portion of a map in a user-selected direction relative to the display area. In some embodiments, panning can be implemented by moving a virtual camera in a plane parallel to the ground plane of the map without altering the orientation of the camera.

Referring to FIG. 3A, if map 300*a* is displayed on a touchscreen display, the user can place a contact 302*a* (e.g., a finger) on the screen and move contact 302*a* in some direction, as indicated by arrow 304. In response, the electronic device can translate the map in the indicated direction, as shown by map 300*b* of FIG. 3B.

In some embodiments, the map is translated in coordination with the contact motion 304 such that approximately the same location on the map remains under the contact, as shown in FIG. 3B, where contact 302*b* and map 300*b* have both shifted relative to the edges of the display area. For example, in map 300*a*, an art museum is under contact 302*a*, and, in map 300*b*, the same art museum remains approximately under contact 302*b*. Thus, the user can control the speed and direction of movement of the map, and the pan gesture can provide an experience of "dragging" the map. Dragging the map can refer to changing the portion of the map that is displayed in a display area and/or changing the parameters that define the border of the visible portion.

In some embodiments, the user can change direction. For example, the user can place a contact 302*a* (e.g., a finger) on the screen and move contact 302*a* in some direction, as indicated by arrow 304, and then move the contact 302*a* in another direction (e.g., right, left, up, down, or diagonally). In response, the electronic device can translate the map with the movement of the contact as the contact is being moved. Pan gestures are not limited to linear motion. In some embodiments, the user can define curving motion paths for the map. For example, movement of contact 302*a* can be a curved path (instead of the straight line indicated by arrow 304). Movement of contact can include any combination of linear and non-linear movement.

In some embodiments, pan can be regarded as a gesture involving linear motion of one contact or of two or more contacts in a parallel direction. Panning with two (or more) contacts can be distinguished from other gestures based on various combinations of characteristics of the motion, including linearity, direction, and speed of motion. Relative locations of the contacts can also be used to distinguish between gestures. Examples are described below.

Figure 4B:
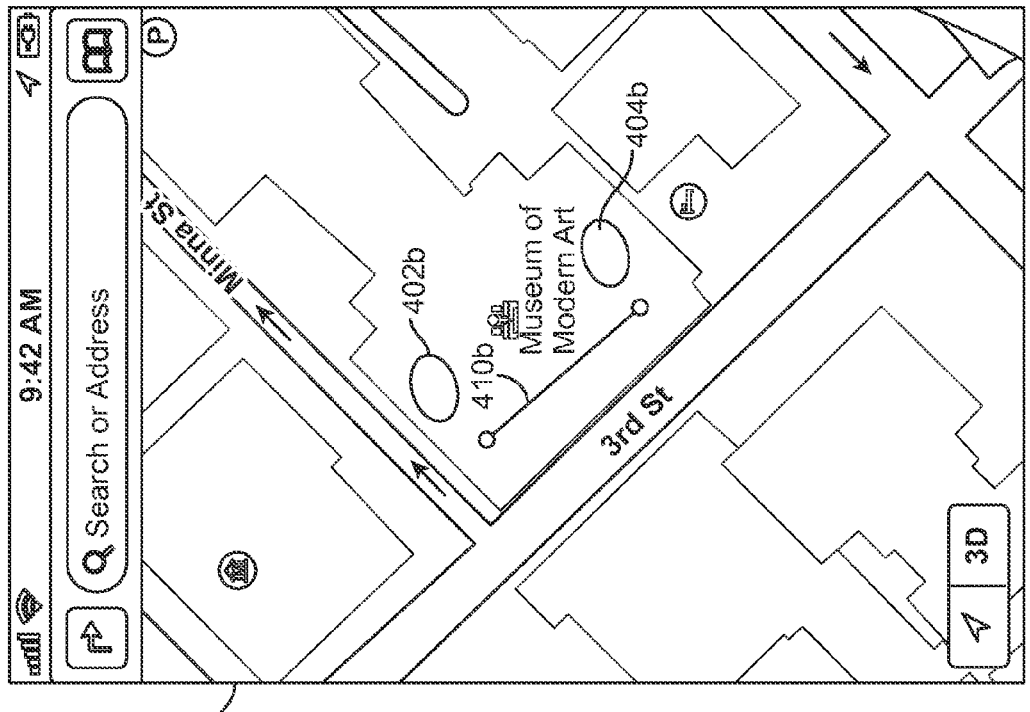
FIGS. 4A and 4B illustrates a zoom-in gesture according to an embodiment of the present invention.
Figure 4A:
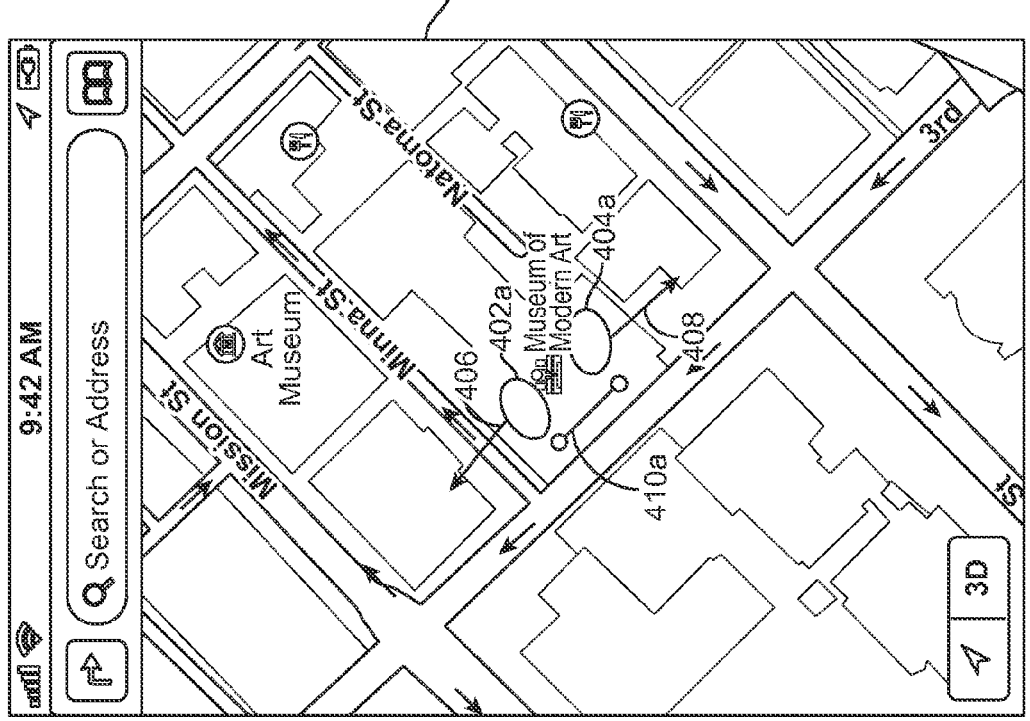

FIGS. 4A and 4B illustrate a "zoom-in" gesture that causes the electronic device to enlarge the size of the rendered map. In some embodiments, zooming (in or out) can be implemented by moving the virtual camera along its optical axis, toward the ground plane to zoom in or away from the ground plane to zoom out. In some embodiments, zooming can be implemented by changing a magnification factor or focal length associated with the virtual camera.

Referring to FIG. 4A, if map 400*a* is displayed on a touchscreen display, the user can place two contacts 402*a* and 404*a* (e.g., a finger and thumb, or two fingers) in contact with the touchscreen and move contacts 402, 404 away from each other, as indicated by arrows 406, 408. In response, the electronic device can enlarge the map as shown in FIG. 4B. This motion is sometimes referred to as an outward pinch or "depinch." In some embodiments, a depinch (or pinch) motion can be identified by the angle formed by arrows 406, 408. For example, if within a threshold angle of zero degrees, a zoom in/out operation can be identified.

In some embodiments, the map is enlarged in coordination with the contact motion such that approximately the same location on the map remains under each contact, as shown in FIG. 4B. For example, contacts 402*a* and 402*b* are both near the same intersection on maps 400*a* and 400*b* (e.g., near the corner of Minna Street and 3rd Street), and contacts 404*a* and 404*b* are near the same location on maps 400*a* and 400*b* (e.g., just off 3rd Street, about halfway down the block). That is, the contacts may have similar positions with respect to map subjects after movement 406, 408 causes a change in the display for map 400*a* to 400*b*. Thus, the user can control the speed, degree, and center location for the zooming operation.

In some embodiments, the zoom-in is coordinated with the contact motion if the contacts move slowly; that is, a slow depinch. In some embodiments, a fast depinch gesture can cause the map to be enlarged by a predefined step size, e.g., from a current magnification factor to a next "step." There can be any number of predefined steps, e.g., 10, 16, 20 steps, etc., from a minimum magnification to a maximum magnification. Fast depinch may be used to zoom out more quickly, for example, if the user wants to go from a very zoomed-in view (e.g., of city blocks) to a very zoomed-out view (e.g., a city view, state view, country view, or the like).

Although not separately illustrated, a related "zoom-out" gesture can also be defined to reduce the size of the rendered map. The zoom-out gesture can be defined as an inward pinch or "pinch," e.g., reversing the motions of contacts 402 and 404 of FIGS. 4A and 4B so that they move closer together rather than farther apart. The same concepts described above with respect to depinching and zooming in, including fast and slow depinches and coordination of the map enlargement to the depinch motion contact, can be applied to an inward pinch operation for zooming out.

In some embodiments, where the zoom operation is coordinated with the motion of the contacts, zooming in and out can be performed in response to a single gesture. A single gesture can be defined as lasting, or occurring, from the time of an initial gesture until a gesture termination event (e.g., lifting one or more contacts from the touch-sensitive surface). For example, the user may begin by zooming out, decide she has gone too far, and reverse the motion to zoom back in. In this example, two of the user's fingers (or other contacts) remain in contact with the touch-sensitive surface when zooming out and zooming back in.

In some embodiments, zoom-in and zoom-out can be regarded as a single gesture that can be characterized by two or more contacts that move approximately linearly in a manner that changes (increases or decreases) the distance between them. For example, as illustrated in FIGS. 4A and 4B, contacts 402a and 404a are separated by a first distance (410a); after motions 406 and 408, contacts 402b and 404b are separated by a second distance (410b). In the illustrated depinch operation, the first distance is less than the second distance. In a pinch operation, the first distance can be greater than the second distance.

FIGS. 5A and 5B illustrate a "rotate" gesture that causes the electronic device to rotate the map relative to the display, allowing the user to view the map from different angles. In some embodiments, rotation can be implemented as a rotation of a virtual camera about its optical axis, reorienting the camera's "up" vector. However, for users looking at a 3D map, this may not produce the desired effect, particularly if the optical axis is not oriented normal to the ground plane of the map. Instead, the user may prefer to have a rotation that presents a view of the same area from a different direction (e.g., looking east versus north), rather than showing the area sideways or upside down. Accordingly, in some embodiments, the rotation operation can be defined as moving the virtual camera in a circle parallel to the ground plane of the map. The center of the circle is a "target point" where the optical axis of the virtual camera intersects the ground plane, and the radius of the circle is determined from the current tilt angle and camera position. Simultaneously, with motion around the circle, the camera is reoriented to keep the optical axis aimed at the target point. In the special case where the optical axis is normal to the ground plane (looking straight down), the circular motion of the virtual camera can become a rotation about the optical axis.

Referring to FIG. 5A, if map 500a is displayed on a touchscreen display, the user can place two contacts 502a and 504a (e.g., a finger and thumb, or two fingers) in contact with the touchscreen and move the contacts in an arcing manner, approximately around a common center of the contacts. For the user, the motion can be similar to twisting a dial with a finger and thumb. In response, the electronic device can rotate map 500b as shown in FIG. 5B. In some embodiments, as the map is rotated, textual elements associated with the map, including street and landmark identifiers, can be re-oriented such that they remain approximately right-side-up, as can be seen by comparing FIGS. 5A and 5B.

In some embodiments, the rotation is performed in coordination with the motion of contacts 502a to 502b and 504a to 504b (as indicated by arrows 506 and 508). The magnitude of the rotation can be such that a full 360-degree rotation of contacts 502a, 504a around the common center corresponds to a full 360-degree rotation. Where this is the case, a rotation performed with the optical axis orthogonal to the map can result in approximately the same location on the map remaining under contacts 502, 504a, as shown in FIGS. 5A and 5B. For example, contact 502a can be in approximately the same location on the map relative to other map objects as compared to contact 502b (e.g., just off Minna Street, about one quarter of the way down the block), and contact 504a can be in approximately the same location on the map relative to other map objects as compared to contact 504b (e.g., near the art museum). For other orientations of the optical axis, this is not necessarily the case.

In some embodiments, the rotation is coordinated with the contact motion if the gesture is performed slowly. In some embodiments, a fast rotation gesture can cause the map to rotate through a predetermined angle (e.g., 45 degrees or 90 degrees). In some embodiments, a rotation gesture can be distinguished from other gestures based on the rotational (as opposed to linear) component of the motion, with two contacts rotating in the same direction around some point between them.

Figures 6A, 6B:
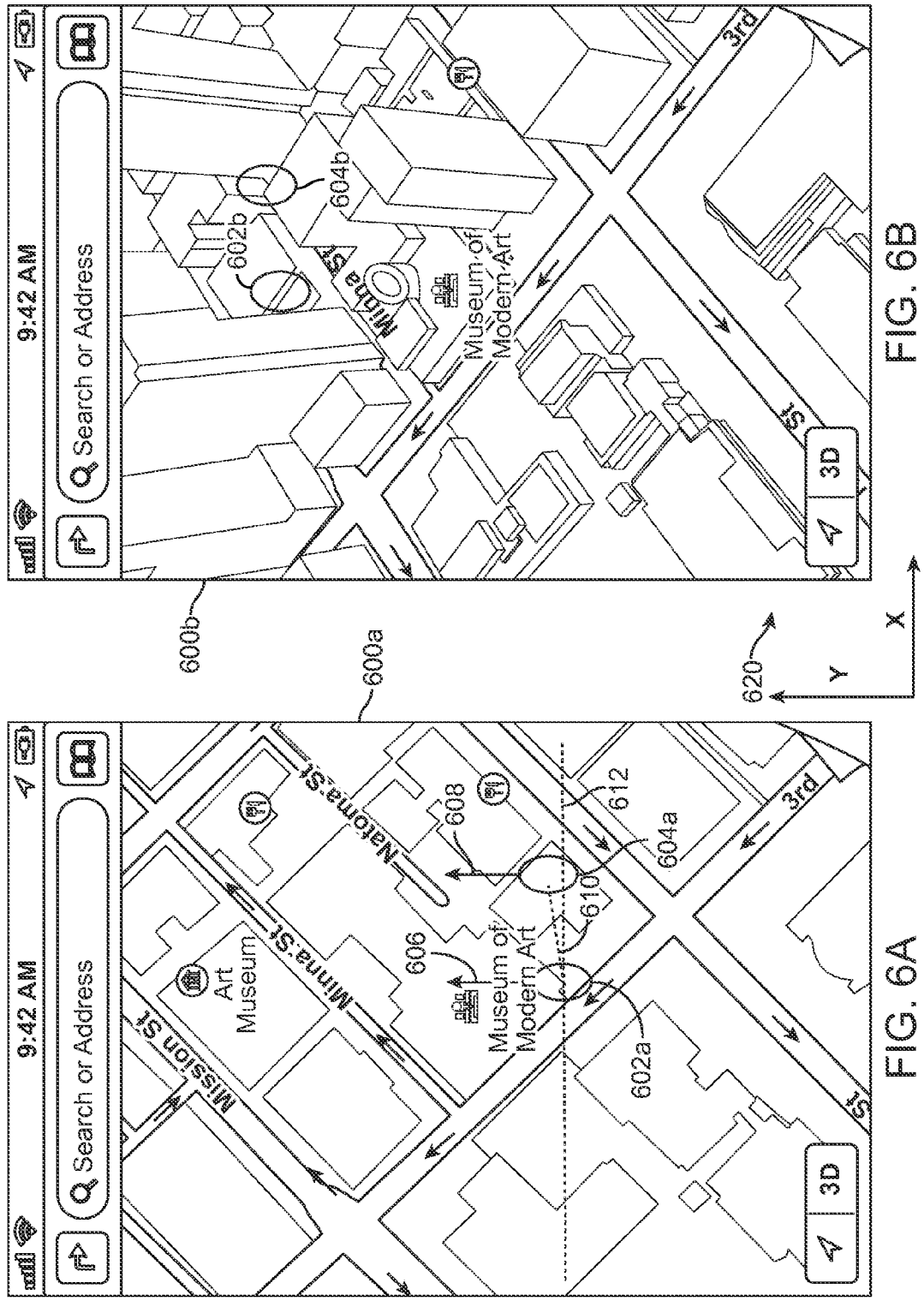
FIGS. 6A and 6B illustrate a tilt gesture according to an embodiment of the present invention.

FIGS. 6A and 6B illustrate a "tilt" gesture that can be used to adjust the angle relative to the ground plane at which the map is viewed; this angle is sometimes referred to as a tilt angle or pitch. In some embodiments, a tilt-angle adjustment is implemented somewhat similarly to rotation, except that the virtual camera moves in a circle normal to the ground plane. The center of the circle is the target point where the optical axis intersects the ground plane, and the plane of the circle is defined as containing the optical axis and the normal to the ground plane. As the virtual camera moves along this vertically-oriented circle, the camera is simultaneously reoriented so that the optical axis remains aimed at the target point. The tilt angle is defined as the angle between the ground plane and the optical axis, with zero degrees corresponding to the ground plane and 90 degrees (normal to the ground plane) corresponding to looking straight down.

Referring to FIG. 6A, map 600a is displayed at a tilt angle of 90 degrees, i.e., looking straight down at the map area from above. To tilt the map (or change tilt angle), the user can place two contacts 602a and 604a (e.g., two fingers, or a finger and a thumb) side-by-side along the X axis of the display and move contacts 602a, 604a in a direction approximately orthogonal to the line joining them, as indicated by arrows 606, 608, resulting in the placement of contacts 602b and 604b in FIG. 6B. As shown in FIG. 6B, the tilt gesture changes the viewing angle in map 600b so that instead of looking straight down, the map area is seen at an oblique angle.

The speed and magnitude of the tilt-angle change can be determined based on user motions. For example, a conversion factor can be used to convert a distance moved by contacts 602a, 602b, 604a and 604b to a change in tilt angle, and the change can be applied in time with the motion of contacts. In some embodiments, the conversion factor is selected such that a distance equal to 90% of the screen height corresponds to the difference between a maximum and a minimum tilt angle allowed by the maps application; other conversion factors can be used. The distance traveled by the contacts can be measured in two dimensions (X and Y directions, defined as horizontal and vertical respective to a current orientation of the display, as indicated at 620) or in just one dimension (e.g., only the Y direction, neglecting motion in the X direction).

In some embodiments, as shown in FIGS. 6A and 6B, moving contacts 602a, 604a upward (toward the top of the display area) results in tilting the map toward a ground-level view (decreasing tilt angle), and moving contacts 602b, 604b downward (toward the bottom of the display area) results in tiling the map toward a view from above (increasing tilt angle). A user can start a tilt gesture in one direction, and then reverse it within a single gesture.

In some embodiments, the tilt angle is limited to a range between 90 degrees and zero degrees, regardless of the user's motion. Limiting the minimum tilt angle to zero can prevent the user from looking at the map region from below (which can be an unrealistic or uninformative perspective). In some embodiments, the minimum tilt angle can be larger than zero degrees; for example a value such as 15 degrees, 20 degrees, 36 degrees or the like can be used. A limit on the maximum tilt angle can be 90 degrees; in some embodiments, this limit is not applied. Tilt angles larger than 90 degrees, if permitted, can be rendered, e.g., as a "flying upside-down" perspective. (This may be disorienting for some users.)

The tilt gesture can be recognized according to various criteria that distinguish it from other gestures involving two contacts. In some embodiments, these criteria pertain to both the relative positions and motions of the contacts. For example, to detect a tilt gesture, the two contacts can be required to be approximately on a line parallel to the X axis. Accordingly, referring to FIG. 6A, a centroid can be defined for each contact 602, 604 (see, e.g., U.S. Pat. No. 6,326,846, U.S. Pat. No. 7,479,949, and U.S. Patent App. Pub. No. 2008/0036743D for additional description regarding identifying centroids for a contact), and line 610 joining the centroids can be defined. As a first criterion for recognizing a tilt gesture, line 610 can be required to be approximately parallel to a horizontal line (e.g., reference line 612) on the display. Various specific thresholds can be used; for example, an angle between lines 610 and 612 can be required to be less than a predefined maximum angle, which can be, e.g., 30 degrees, 25 degrees, 17 degrees, or some other angle. In some embodiments, a dot product of normalized vectors representing lines 610 and 612 can be calculated and a minimum threshold applied; e.g., dot product greater than 0.3, 0.35, 0.4, 0.5, or some other value.

In addition or alternatively, criteria can be applied to the motion of the contacts. For example, to detect a tilt gesture, the motion of the two contacts can be required to be generally parallel to the Y axis. As another example, a speed criterion can be applied to the motion. In some embodiments, an assumption is made that a user will generally want to change tilt angle slowly and in a controlled manner, a fast motion in the Y direction can be interpreted as not indicating a tilt (it might be interpreted as another gesture, e.g., a pan or a swipe, depending on speed). This can be implemented, e.g., as an upper limit on the speed of the motion of the contacts associated with a tilt gesture.

It will be appreciated that the gestures and maps described herein are illustrative and that variations and modifications are possible. For example, as noted above, in some embodiments, any extra contacts (beyond the gesture-defining number of contacts) can be ignored. In some embodiments, a user can add a new contact and remove one of the original contacts (e.g., switching fingers) during the course of making a gesture, and the action can be treated as a continuation of the same gesture as long as at least the gesture-defining number of contacts (or at least one contact, depending on implementation) remains in contact with the touch-sensitive surface at all times.

Other gestures can also be defined and used in addition to or instead of the gestures above. For example, a fast swipe may translate the map by a predetermined distance in the direction of the swipe. A tapping gesture on a particular location on the map may cause the device to obtain and present information pertaining to that location. Further examples of gestures, gesture interpretation heuristics, and commands that can be associated with gestures are described in U.S. Pat. Nos. 6,326,846; 7,469,381; 7,479,949; and U.S. Patent App. Pub. No. 2008/0036743.

In some embodiments, the range of modification of the map can be limited. For example, as noted above, the tilt angle can be constrained by maximum and minimum values. Zoom (or magnification) can also be constrained by maximum and minimum scale factors. Panning can also be limited, e.g., if the map region has edges. (This might not be the case for a map region encompassing the entire surface of a planet, but might be the case for other types of maps, such as a map of a building, a city, or a fictional region that has boundaries.) When a range limitation is encountered, visual feedback can be provided, e.g., via a rubber-banding effect as described in U.S. Pat. No. 7,469,381.

In some embodiments, modifications of the displayed map can be animated, e.g., to correlate with the motion of a gesture. For instance, motion of the map across the display can appear to accelerate, decelerate, and/or change direction based on changes in the motion. Where the modification is applying a preset change (e.g., in response to fast zoom or fast scroll gestures as described above), acceleration and deceleration can be applied to the modification using appropriate constants; for instance, a coefficient of friction can be used to model acceleration and/or deceleration. Examples of frictional modeling and related visual effects are also described in U.S. Pat. No. 7,469,381. This can make the modifications appear to the user as natural movements.

Figure 7:
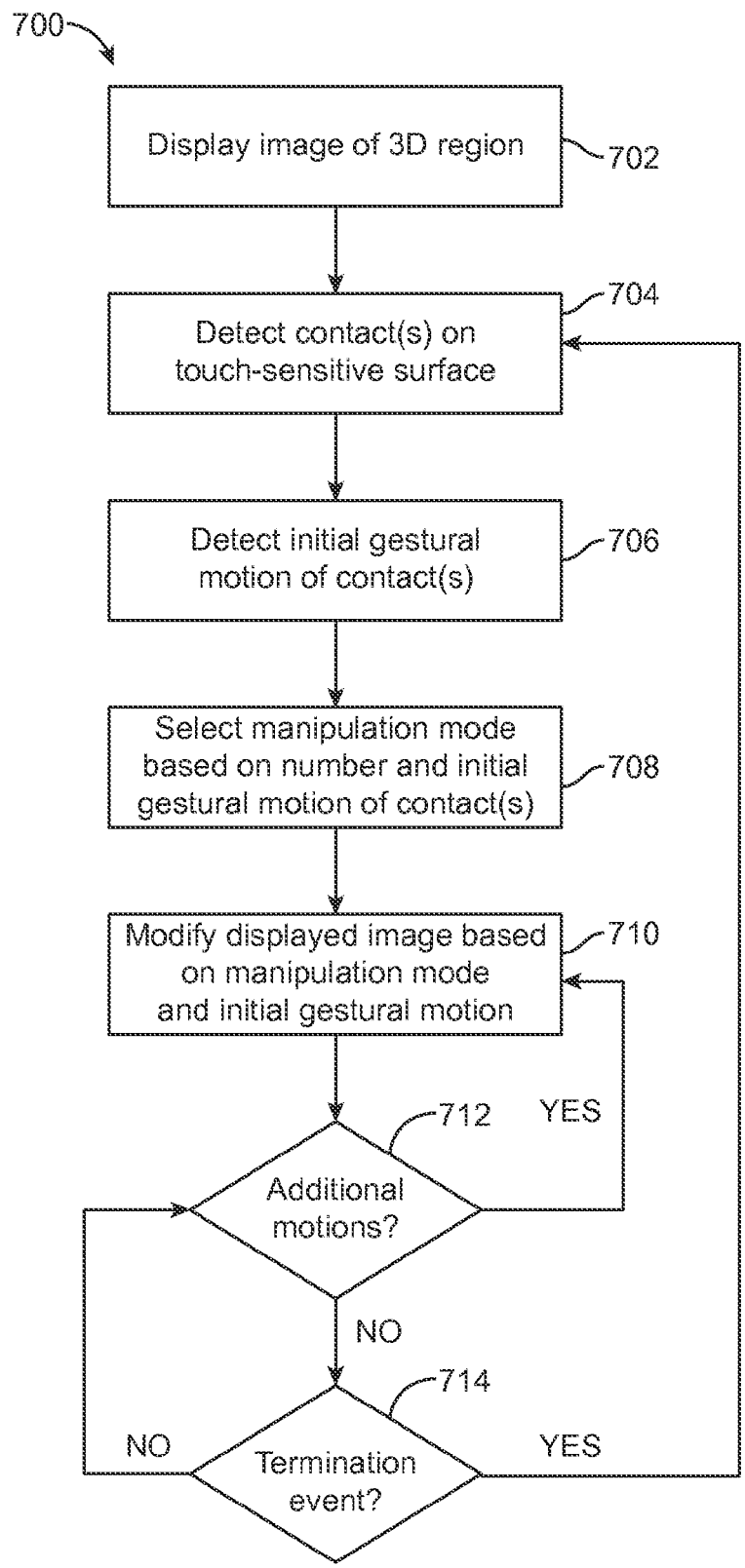
FIG. 7 is a flow diagram of a process for manipulating an image using gestures according to an embodiment of the present invention.

Gestures such as those described above can be used to manipulate a map or any other image of a region in 3D space containing any number and/or type of objects. FIG. 7 is a flow diagram of a process 700 for manipulating an image according to an embodiment of the present invention. Process 700 can be implemented, e.g., in computer system 100 of FIG. 1 or other electronic devices.

At block 702, an image of a 3D region is displayed. Depending on implementation, this image can be, for instance, a map (e.g., map 200 of FIG. 2), a model of an object generated by a computer-aided design (CAD) program, a rendering of an image of a scene containing real and/or computer-generated objects, or any other image of a real or virtual 3D region. The image can be displayed in a default state based on virtual camera parameters such as position, orientation (e.g., a rotation angle), view direction (e.g., tilt angle), and magnification factor. The default state can be determined using startup parameters defined by the program, information received from another program (e.g., an application program that provides restaurant reviews may invoke a maps application to show the location of a particular restaurant, providing the location of the restaurant), or the most recent set of parameters established by the user (e.g., returning to the last-displayed view each time the application launches).

At block 704, process 700 can detect one or more contacts on a touch-sensitive surface of the device. In some embodiments, the touch-sensitive surface can be the display. In some embodiments, other touch-sensitive surfaces can also be used, including track pads, mice, and other user input devices.

At block 706, process 700 can detect an initial gestural motion of the one or more contacts. The initial gestural motion (also sometimes referred to as hysteresis of the gesture) can include any motion large enough and/or fast enough to be recognized as intentional and disambiguated from other motions associated with other gestures; examples of gestural motions are described above and in U.S. Pat. Nos. 6,326,846; 7,469,381; 7,479,949; and U.S. Patent App. Pub. No. 2008/0036743.

At block 708, process 700 can select a manipulation mode based on the number and initial gestural motion of the contacts. Examples of manipulation modes are described further below and can include any combination of the manipulations described above (e.g., pan, rotate, zoom and tilt) and/or other manipulations. In some embodiments, the manipulation mode can be determined using the process illustrated and described with reference to FIG. 9.

Based on the selected manipulation mode and the initial gestural motion, process 700 can modify the displayed image at block 710. For example, if a pan manipulation mode is selected (e.g., based on an initial gestural motion 304 in FIG. 3A), then a pan operation can be performed on the displayed image (e.g., map 300b in FIG. 3B). Any other manipulation modes described above and/or additional manipulation modes can be applied and displayed at block 710.

In some embodiments, while the initial gestural motion at block 706 serves to identify a gesture, the gesture itself can extend beyond the initial gestural motion. Accordingly, at block 712, process 700 can detect additional motion associated with the gesture and further modify the displayed image based on the motion (returning to block 710). At block 714, if additional motion is not detected, process 700 can determine whether a gesture termination event has occurred. For example, a gesture termination event can be detected if all contacts are removed from the touch-sensitive surface and/or if all contacts come to rest for at least a threshold period of time. If a gesture termination event is not detected, process 700 can return to block 712 to detect additional motion associated with the current gesture. When a gesture termination event occurs, process 700 can return to block 702 to detect another contact initiating another gesture.

Process 700 allows a user to interact with a displayed image of a 3D region using any combination of gestures in any sequence and without requiring any additional input to indicate the user's intent. The user can also begin a manipulation gesture, see its effect in real time, and respond accordingly, e.g., continuing the gesture, changing speed or direction, or ending the gesture as desired. Consequently, the user's experience can feel natural and intuitive.

As noted above, the electronic device can automatically distinguish among various gestures that a user might make and select a manipulation mode, with subsequent motion being interpreted and the displayed image manipulated according to the selected mode until a gesture termination event occurs. Selection of manipulation modes will now be described.

In some embodiments, a gesture made by a user can be identified as indicating one or another of a set of distinct manipulations, e.g., any one of the pan, zoom, rotate, or tilt manipulations described above. In this case, the corresponding manipulation can be selected as the manipulation mode. These are also referred to herein as single-control modes, indicating that modifications of only one type at a time are made to the map view.

III. Multi-Control Modes

Some embodiments of the present invention allow a gesture to be identified as invoking a "multi-control" mode in which modifications of two or more types can be made concurrently or simultaneously. An example of a multi-control mode is a mode that allows concurrent or simultaneous modifications to pan (translation), zoom (magnification) and rotation while maintaining a constant tilt angle relative to the vertical axis of the map space.

Figure 8A:
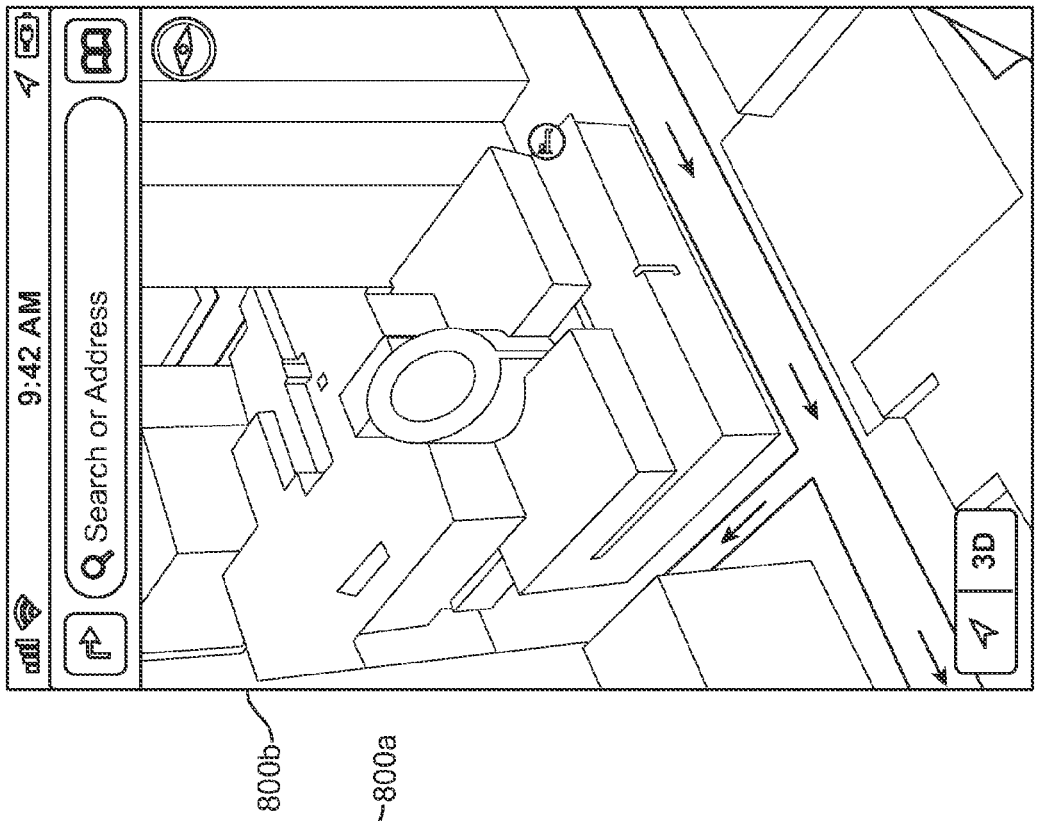
FIGS. 8A and 8B illustrate a multi-control manipulation according to an embodiment of the present invention.
Figure 8B:
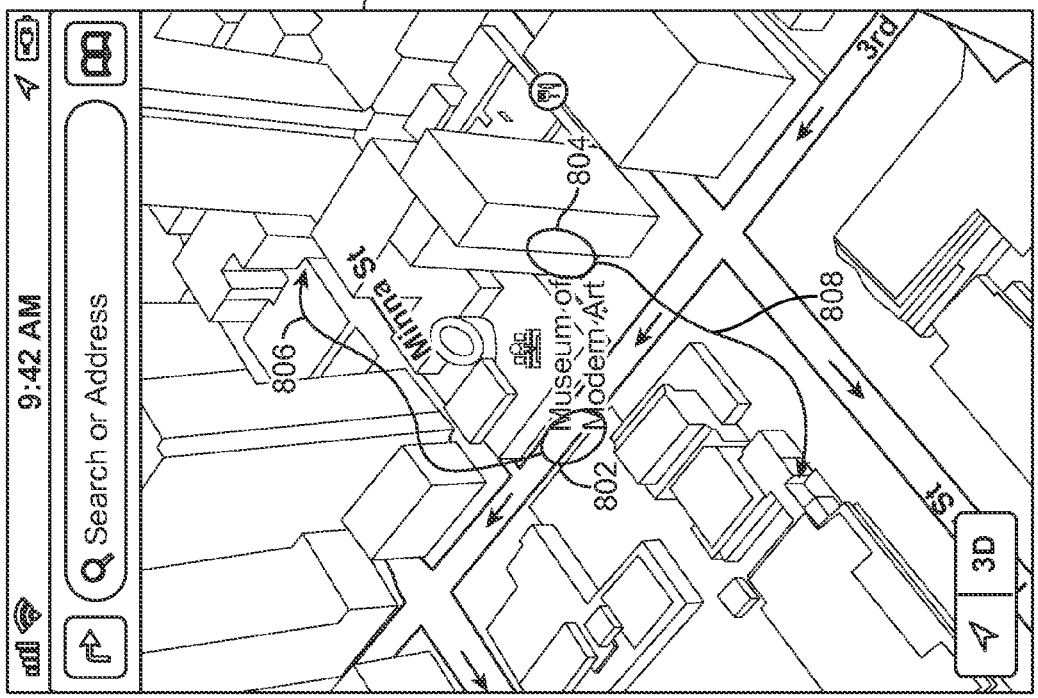

FIGS. 8A and 8B illustrate a multi-control manipulation according to an embodiment of the present invention. FIG. 8A illustrates a map view 800a and contacts 802, 804 executing a multi-control gesture as indicated by arrows 806, 808. This gesture combines elements of linear motion (associated with a pan gesture), rotational motion (associated with a rotate gesture), and expanding motion (associated with a zoom gesture). Based on these elements, map 800a can be translated, rotated and zoomed to produce a new view, e.g., map 800b shown in FIG. 8B. In the multi-control mode, the transformations of the map can be coordinated with the relevant components of the motion, and the user can have the experience of freely adjusting the map to a desired position, orientation, and magnification.

In some embodiments, a multi-control mode can include any combination of two or more modifications (e.g., rotate and pan, pan and zoom, rotate and tilt, etc.), and any number of distinct multi-control modes can be recognized. In some embodiments, tilt control is not included in any multi-control mode but is only available as a single-control mode.

Any available single-control mode or multi-control mode can be selected by the electronic device based on gestural input received via a touch-sensitive surface. The device can implement various heuristics based on characteristics of the gesture (e.g., the number of contacts and properties of an initial motion of the contacts such as direction and/or speed) to determine whether a particular gesture should invoke a single-control mode or a multi-control mode as well as the specific mode to be invoked.

Figure 9:
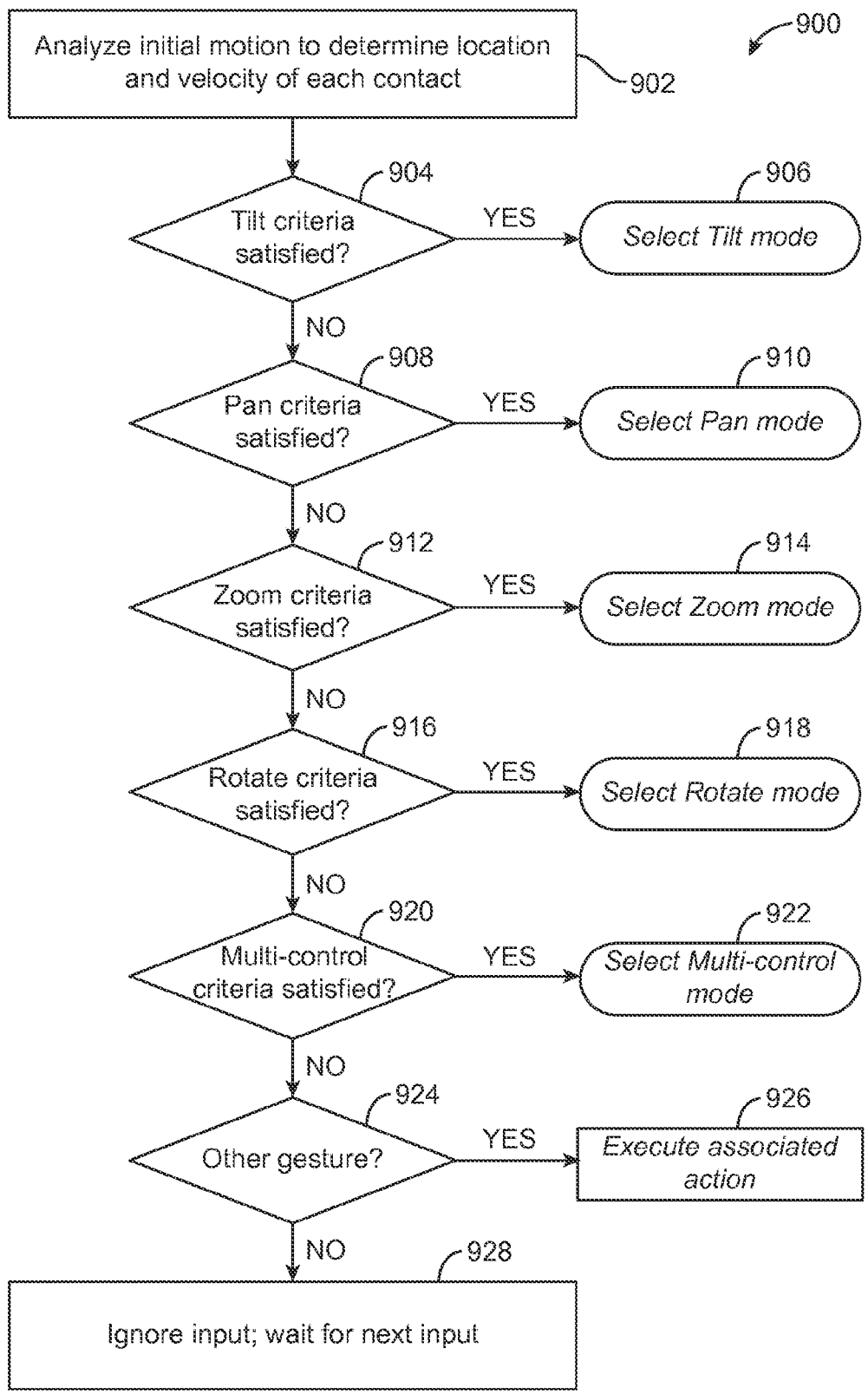
FIG. 9 is a flow diagram of a process for selecting a manipulation mode based on gestural input according to an embodiment of the present invention.

FIG. 9 is a flow diagram of a process 900 for selecting a manipulation mode based on gestural input according to an embodiment of the present invention. Process 900 can be used, e.g., to implement block 708 of process 700.

At block 902, touch data received from a touch-sensitive surface is analyzed to determine a location and velocity (speed and direction) of each of one or more detected contacts. Thereafter, various heuristics can be applied to determine whether the detected motion corresponds to any of the defined gestures.

For example, at block 904, process 900 can determine whether criteria for recognizing a tilt gesture have been satisfied. As described above with reference to FIGS. 6A and 6B, these criteria can include: (a) whether at least two contacts are detected; (b) whether two contacts are arranged approximately parallel to an X axis; (c) whether the contacts are moved in the Y direction; and (d) whether the contacts are moved at less than a maximum speed. If the tilt criteria are met, then at block 906, process 900 can select the tilt mode, which is a single-control mode. Referring to FIG. 7, if the tilt mode is selected at block 708, subsequent motion can be processed as a continuation of the tilt gesture until a termination event occurs.

Referring again to FIG. 9, at block 908, process 900 can determine whether criteria for recognizing a pan gesture have been satisfied. As described above with reference to FIGS. 3A and 3B, these criteria can include: (a) whether at least one contact is detected; and (b) whether a contact moves primarily linearly. If the pan criteria are met, then at block 910, process 900 can select the pan mode, which is another single-control mode. Referring to FIG. 7, if the pan mode is selected at block 708, subsequent motion can be processed as a continuation of the pan gesture until a termination event occurs.

Referring again to FIG. 9, at block 912, process 900 can determine whether criteria for recognizing a zoom gesture have been satisfied. As described above with reference to FIGS. 4A and 4B, these criteria can include: (a) whether at least two contacts are detected; (b) whether one or more of the contacts move toward or away from another; and (c) whether the motion is primarily linear. If the zoom criteria are met, then at block 914, process 900 can select the zoom mode, which is a third single-control mode. Referring to FIG. 7, if the zoom mode is selected at block 708, subsequent motion can be processed as a continuation of the zoom gesture until a termination event occurs.

Referring again to FIG. 9, at block 916, process 900 can determine whether criteria for recognizing a rotate gesture have been satisfied. As described above with reference to FIGS. 5A and 5B, these criteria can include: (a) whether at least two contacts are detected; (b) whether two of the contacts move in a roughly circular pattern; and (c) whether the motion is approximately rotational around a common center. If the rotation criteria are met, then at block 918, process 900 can select the rotate mode, which is a fourth single-control mode. Referring to FIG. 7, if the rotate mode is selected at block 708, subsequent motion can be processed as a continuation of the rotate gesture until a termination event occurs.

Referring again to, FIG. 9, at block 920, process 900 can determine whether criteria for recognizing a multi-control gesture have been satisfied. As described above with reference to FIG. 8A-8B, a multi-control mode can be invoked with a gesture that combines aspects of various single-control gestures. Thus, for example, if the multi-control mode allows pan, zoom and rotate, criteria for recognizing a multi-control gesture can include: (a) whether two or more contacts are detected; (b) whether the speed of the initial motion of one or more contacts is below a threshold; and (c) whether the initial motion combines attributes of at least two single-control gestures such as pan-plus-zoom, rotate-plus-zoom, or rotate-plus-pan. If the multi-control criteria are met, then at block 922, process 900 can select the multi-control mode. Referring to FIG. 7, if the multi-control mode is selected at block 708, subsequent motion can be processed as a combination of panning, rotation, and zooming based on the particular motions. Multi-control mode can continue to be applied until a gesture termination event occurs.

In some embodiments, the device may recognize gestural input to invoke functions other than manipulating the displayed image. Accordingly, referring again to FIG. 9, at block 924, process 900 can determine whether criteria for recognizing some other gesture (e.g., tap, double-tap, swipe, etc.) are satisfied. Examples of gesture-recognition criteria for a number of gestures are described in U.S. Pat. Nos. 6,326,846; 7,469,381; 7,479,949; and U.S. Patent App. Pub. No. 2008/0036743. If another gesture is recognized, then at block 926, process 900 can execute an action associated with the gesture, which might or might not include modifying the image. Referring to FIG. 7, if a gesture is recognized at block 708 that does not relate to manipulating the displayed image, process 700 can return to block 704 after executing the appropriate action at block 924 (or exit, depending on the action in question).

Referring again to FIG. 9, if, at block 924, no gesture was recognized, process 900 can determine to ignore the input (block 928). Referring to FIG. 7, in this case, process 700 can return to block 704 to await another gesture.

It will be appreciated that processes 700 and 900 are illustrative and that variations and modifications are possible. Steps described as sequential may be executed in parallel, order of steps may be varied, and steps may be modified, combined, added or omitted. For instance, while FIG. 9 illustrates a particular order in which criteria can be applied, it is to be understood that any order can be used. Further, the criteria described in connection with various gestures are illustrative, and other criteria can be used. Additional description of techniques for recognizing and interpreting gestural input is provided in U.S. Pat. Nos. 6,326,846; 7,469,381; 7,479,949; and U.S. Patent App. Pub. No. 2008/0036743.

Figure 10:
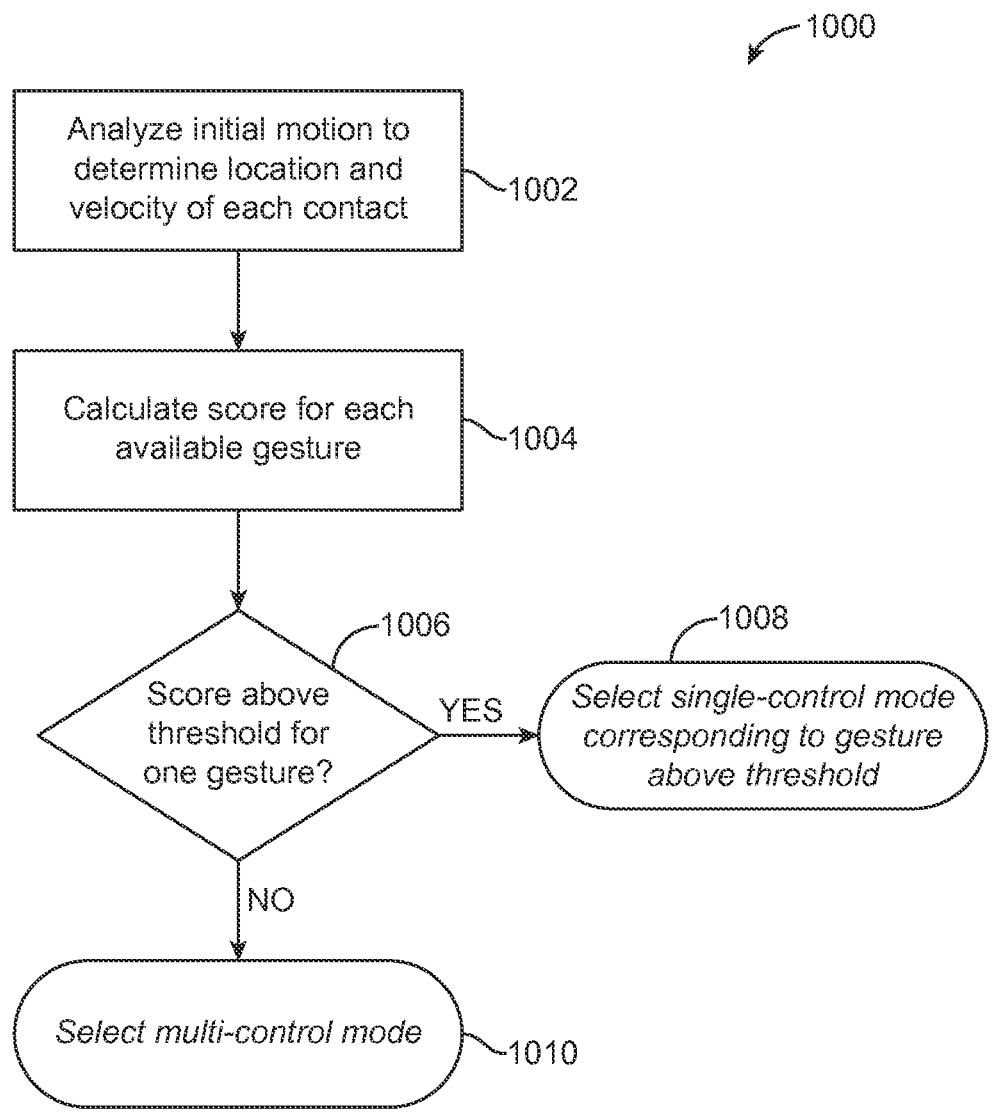
FIG. 10 is a flow diagram of another process for selecting a manipulation mode based on gestural input according to an embodiment of the present invention.

In some embodiments, gesture recognition can be based on a scoring model rather than on satisfying specific criteria. FIG. 10 is a flow diagram of a process 1000 for selecting a manipulation mode based on gestural input according to an embodiment of the present invention that implements a scoring model. Process 1000 can be used, e.g., to implement block 708 of process 700.

At block 1002, touch data received from a touch-sensitive surface is analyzed to determine a location and velocity (speed and direction) of each of one or more detected contacts. At block 1004, a score can be calculated for each gesture in a predefined library of possible gestures. The library can include, for example, pan, zoom, rotate and tilt gestures as described above; other gestures can also be included. The library can define a scoring function for each gesture, with the score being a mathematical function of characteristics of the contacts and/or their initial motion. The score can be defined to reflect the probability that a gesture having a certain set of characteristics is intended to be the particular gesture being scored. In some embodiments, a scoring function can be devised based on biomechanical constraints (e.g., range of motion of fingers), assumptions about user behavior, and/or statistical data gathered from a pool of users attempting to make various gestures in circumstances where the intended gesture is known. A variety of algorithms and techniques can be used to define scores for different gestures, and the library can include any number of gestures. In some embodiments, threshold-based criteria and/or context-based criteria can be used as a filter to reduce the number of gestures for which scores are calculated.

At block 1006, the scores associated with different gestures can be checked to determine if any single gesture has a score above a threshold. The threshold can be defined as an absolute score or as a difference between the two highest scores or between the highest score and an average of scores, or the like. If exactly one gesture has a score above the threshold, then at block 1008, a single-control mode corresponding to the gesture with a score above the threshold is selected. In some embodiments, block 1008 can also include executing functions associated with a gesture that does not relate to image manipulation, similarly to block 922 of process 900 described above.

At block 1010, if no gesture scored above the threshold, or if multiple-gestures scored above the threshold, a multi-control mode can be selected. For example, if multiple gestures scored above the threshold, a multi-control mode that includes all such gestures can be selected. If no gesture scored above the threshold at block 1006, then a lower threshold than at block 1006 can be applied, and the selected multi-control mode can include the gestures that scored above the lower threshold. As another example, if the two (or three or four, etc.) highest scores are sufficiently close to each other, the selected multi-control mode can combine the manipulations associated with the gestures having the two (or three, or four, etc.) highest scores. In some embodiments, a single multi-control mode can be defined (e.g., including rotate, pan and zoom controls), and this mode can be selected whenever the scoring comparison at block 1006 does not indicate a single unambiguous gesture. Other techniques for defining and selecting a multi-control mode can also be used.

Figure 11B:
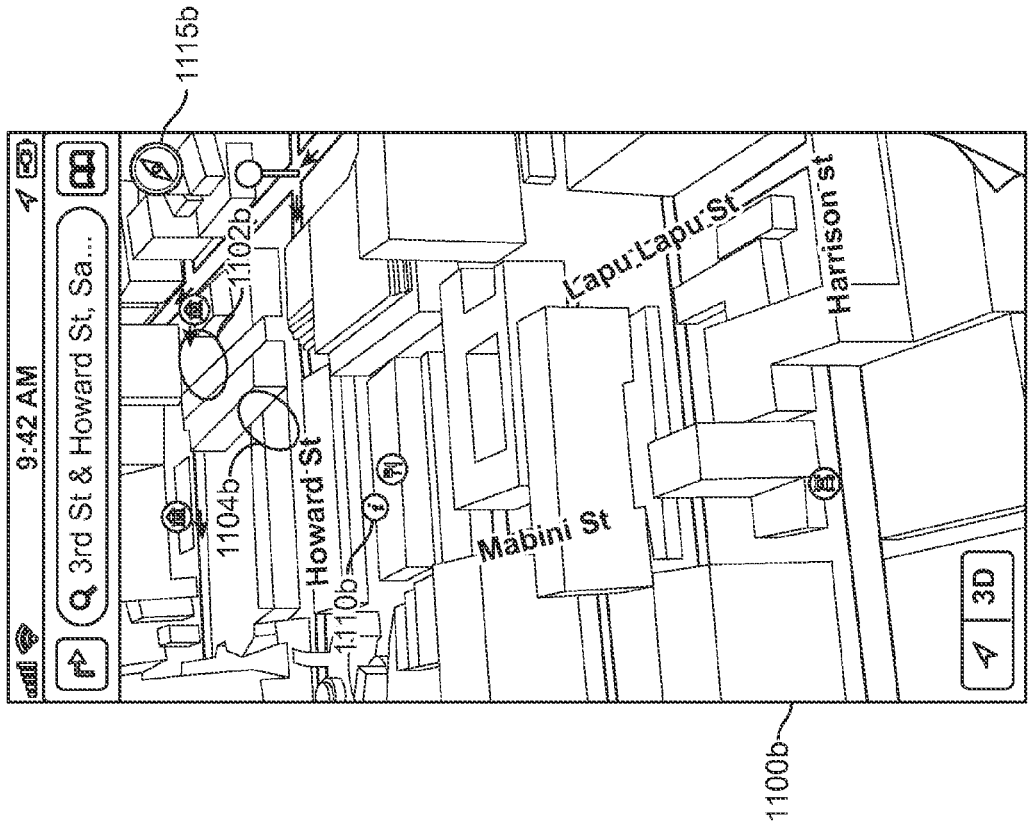
FIGS. 11A and 11B illustrate a multi-control manipulation according to an embodiment of the present invention.
Figure 11A:
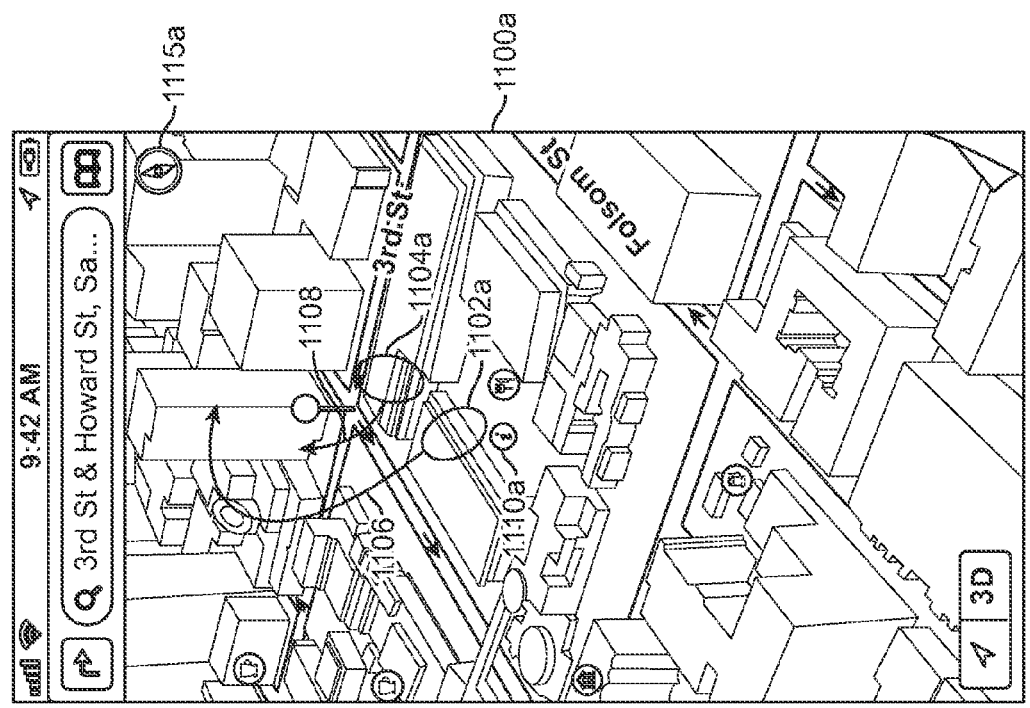

Additional multi-control modes are illustrated in FIGS. 11A, 11B, 12A, and 12B. FIGS. 11A and 11B illustrate a multi-control manipulation according to an embodiment of the present invention. FIG. 11A illustrates a map view 1100a and contacts 1102a, 1104a executing a multi-control gesture as indicated by arrows 1106, 1108. This gesture combines elements of motion (associated with a pan gesture) and rotational motion (associated with a rotate gesture). The gesture may include other elements of motion, but they are not described here.

For example, contact 1102a can be moved along arrow 1106 in FIG. 11A to move to 1102b in FIG. 11B, while simultaneously contact 1104a can be moved along arrow 1108 in FIG. 11A to move to 1104b in FIG. 11B. Based on these elements, map 1100a can be translated and rotated to produce a new view, e.g., map 1100b shown in FIG. 11B. In the multi-control mode, the transformations of the map can be coordinated with the relevant components of the motion, and the user can have the experience of freely adjusting the map to a desired position, orientation, and magnification.

As illustrated in FIGS. 11A and 11B, the positioning of objects in the viewable area changed from map 1100a to map 1100b. For example, object 1110a is near the center of the viewable area in map 1100a, and object 1110b is towards the top of map 1100b. This change could be associated with a pan operation based on the linear movement of the contacts. Further, the orientation of the objects in the viewable areas changed from map 1100a to map 1100b. For example, orientation indicator 1115a shows a first orientation, and orientation indicator 1115b shows a second orientation. The change in orientation can be a result of the angular rotation of the contacts, for example, associated with a rotate operation.

As illustrated in FIGS. 11A and 11B, the distance between contacts 1102a and 1104a and the distance between 1102b and 1104b is approximately the same. Therefore, in the illustration shown, there is little (or no) zooming in or zooming out, and the size of the building is approximately the same. A two-mode manipulation mode can occur when it is determined that two (and only two) manipulation modes are desired by the user.

Another example of a multi-control manipulation according to an embodiment of the present invention is shown in FIGS. 12A and 12B. FIG. 12A illustrates a map view 1200a and contacts 1202a, 1204a executing a multi-control gesture as indicated by arrows 1206, 1208. This gesture combines elements of motion (associated with a pan gesture) and zoom-out motion (associated with a zoom gesture). The gesture may include other elements of motion, but they are not described here.

For example, contact 1202a can be moved along arrow 1206 in FIG. 12A to move to 1202b in FIG. 12B, while simultaneously contact 1204a can be moved along arrow 1208 in FIG. 12A to move to 1204b in FIG. 12B. Based on these elements, map 1200a can be translated and rotated to produce a new view, e.g., map 1200b shown in FIG. 12B. In the multi-control mode, the transformations of the map can be coordinated with the relevant components of the motion, and the user can have the experience of freely adjusting the map to a desired position, orientation, and magnification.

As illustrated in FIGS. 12A and 12B, the positioning of objects in the viewable area changed from map 1100a to map 1100b. For example, the objects associated with the Moscone Convention Center (and associated textual information) change positions relative to the edges of the viewable area. This change could be associated with a pan operation from the linear movement of the contacts. In some embodiments, as described above, the pan movement can be coordinated. For example, contacts 1202a and 1202b are approximately in the same position relative to the object (e.g., a building) which the contacts are over, and contacts 1204a and 1204b are approximately in the same position relative to the object (e.g., another building) which the contacts are over.

Further, the scale of the objects in the viewable areas changed from map 1200a to map 1200b. The change scale can be a result of a zoom in/out operation. As illustrated, the distance between contacts 1102a and 1104a is greater than the distance between 1102b and 1104b. Additionally, the movement of the contacts is substantially linear with respect to other of the contacts. In some embodiments, as described above, the zoom movement can be coordinated. For example, contacts 1202a and 1202b are approximately in the same position relative to the object which the contacts are over (e.g., an end of a building), and contacts 1204a and 1204b are approximately in the same position relative to the object which the contacts are over (e.g., a middle portion of the same building). In the illustration shown, there is little (or no) angular rotation (e.g., as would happen if a user were simulating twisting a dial); therefore, the orientation of maps 1200a and 1200b is approximately the same. This orientation can be reflected by orientation indicators 1215a and 1215b in addition to displaying map objections at approximately the same orientation.

It will be appreciated that the mode selection processes described herein are illustrative and that variations and modifications are possible. Steps described as sequential may be executed in parallel, order of steps may be varied, and steps may be modified, combined, added or omitted. Different combinations of score-based and threshold-based criteria can be used to distinguish different gestures. The criteria can incorporate any information that can be detected by the touch-sensitive surface, including but not limited to: number of contacts; location of each contact relative to other contacts; location of each contact relative to the touch-sensitive surface (also referred to as "absolute" location); speed of movement of each contact; direction of movement of each contact (which can be defined relative to the touch-sensitive surface and/or relative to one or more other contacts); pressure associated with each contact; duration of each contact; time between successive contacts; etc. Gesture recognition can be based on specific criteria applied sequentially (e.g., as a decision tree) or in parallel, on scoring models, and/or any combination thereof.

Embodiments described above provide for recognition of a variety of gestures related to manipulating a displayed image of a 3D region. The gestures can allow the user to change the direction from which the region is viewed (e.g., by rotating and/or tilting), the magnification of the image (e.g., by zooming) and/or the portion of the image that is visible (e.g., by panning) In some embodiments, the effect of image-manipulation gestures can be implemented by rendering the image from the point of view of a virtual camera, and the gestures can be interpreted as changing the location and/or orientation of the virtual camera. Operation in a single-control mode allows the user to adjust one viewing parameter at a time, while operation in a multi-control mode allows multiple viewing parameters to be adjusted simultaneously, giving the user flexible and intuitive control over the view. The device can automatically determine whether to operate in a single-control mode or a multi-control mode based on characteristics of the gestures, and the user can change modes at any time by terminating a current gesture and initiating a new one.

As noted above, some embodiments provide one multi-control mode that allows simultaneous control of pan, zoom and rotation while keeping the tilt angle constant. For some applications (such as maps), this can be helpful in that adjusting tilt angle can be more disorienting for the user than adjusting other parameters. In other applications, other multi-control modes may be desired; for example, in a CAD application, a multi-control mode may allow rotating the object (or the view) around different axes but not zooming while rotating.

While the invention has been described with respect to specific embodiments, one skilled in the art will recognize that numerous modifications are possible. For example, while image manipulation is illustrated with reference to 3D maps, similar gestures and interpretations can be used to manipulate any kind of image of a 3D object or region in a variety of applications, including but not limited to CAD applications, computer-animation applications, video games, and so on. The particular gestures described herein can also be modified, and various embodiments can include more or fewer gestures and/or different combinations of gestures than those described above. Gestures can also be interpreted as indicating different commands; for example, one could define pitch, roll and yaw gestures for positioning a virtual (or real, depending on application) camera or other object in 3D space.

In some embodiments, gestures not related to manipulating the image or the view of the image can also be incorporated. For instance, the user may be able to edit an image (e.g., by adding, altering or repositioning objects), or the user may be able to obtain additional information about an object in the image (e.g., information about a business establishment shown on a map, such as hours, phone number, reviews and feedback, etc.). An example of an object is object 1110 in FIG. 11, an information icon that can be selected for additional information. Other examples of objects in an image include restaurant 202 or a museum 204 in FIG. 2.

Additional information might be presented in a pop-up graphical element associated with the object in the image. In some embodiments, pop-up graphical elements are presented when an object is selected. Pop-up graphical element 1210 in FIG. 12 is an example of presenting additional information. In some embodiments, pop-up graphical elements can be displayed in response to a user selection of an object in the image, while in other embodiments, pop-up graphical elements can be displayed in response to a search query. In some embodiments, pop-up graphical elements can be displayed automatically based on predetermined criteria.

In some embodiments, pop-up graphical elements can appear to "hover" over the object as if "in the air" above the object when in a 3D mode. In a 2D mode, pop-up graphical elements can appear adjacent to the object (e.g., above, below, or next to the object). In response to manipulation gestures, the pop-up graphical element can remain in approximately the same position relative to the object. For example, the pop-up graphical element can remain "hovering" over the object after a zoom, pan, rotate, tilt or combination thereof. In some embodiments, pop-up graphical elements remain approximately the same size in response to zoom in or zoom out operations, while the surrounding objects in the image are resized. In some embodiments, pop-up graphical elements remain approximately in the same position within the viewable area, while the surrounding objects in the image are repositioned.

In some embodiments, pop-up graphical elements remain displayed on the image as long as the object associated with the pop-up graphical element is displayed on the screen. For example, the pop-up graphical element may remain displayed on the screen after a pan (or rotate, tilt, zoom) operation so long as, after the operation, the object remains in the viewable area. In some embodiments, if the object leaves the viewable area (and/or is obstructed by another object on the display, such as a 3D building object), the pop-up notification disappears. In some embodiments, when the object reenters the viewable area (e.g., as a result of a gesture that pans the view so that the object is off the screen and then pans back to approximately the original view), the pop-up graphical element is not redisplayed, whereas in other embodiments, the pop-up graphical element is redisplayed.

In addition, the gesture interpretation techniques described herein provide the ability to disambiguate gestures, including instances where a gesture can invoke a multi-control operating mode that combines multiple gestures that are also individually recognized. Such techniques have applicability to situations other than manipulating a 3D image, and accordingly techniques described herein can be used in other contexts to distinguish related gestures and allow multi-control modes for any user interaction, including interactions not related to images of 3D regions or objects.

Gestures can be detected using any touch-sensitive surface. In some embodiments, the touch-sensitive surface can be an overlay or other component of a display device, providing a touchscreen interface; however, touch-sensitive surfaces located separately from a display device, such as track pads, can also be used. Contact can be made using a finger, a stylus, or any other object detectable by the particular touch-sensitive surface. In some embodiments, the touch-sensitive surface may be sensitive to proximity, and a "contact" may be detected based on proximity to the surface without requiring actual physical contact.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors), to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer-readable storage media; suitable media include magnetic disk or tape, optical storage media such as compact disk (CD) or DVD (digital versatile disk), flash memory, and other non-transitory media. Computer-readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
  at an electronic device with a display and a touch-sensitive surface:
    displaying, on the display, an image of a 3D region;
    detecting an initial portion of an input on the touch-sensitive surface, the initial portion of the input having characteristics including:
      one or more contacts; and
      an initial motion of at least one of the one or more contacts;
    while continuing to detect the input and prior to detecting a termination of the input, wherein termination of the input is detected based on liftoff of the one or more contacts included in the input:
      determining, based on the characteristics of the initial portion of the input, a manipulation mode, wherein:
        the manipulation mode is determined from a plurality of modes including at least one single-control mode and at least one multi-control mode;
        a respective single-control mode allows a single first type of modification to the image of the 3D region at a time during a remainder of the input, and a respective multi-control mode allows two or more types of modifications of the image of the 3D region simultaneously during the remainder of the input including a second type of modification of the image of the 3D region that is different from the first type of modification of the image of the 3D region;
      in accordance with a determination, based on the characteristics of the initial portion of the input, that the input has been recognized as a first gesture:
        entering a first single-control mode that is associated specifically with the first gesture, and
        modifying the image of the 3D region in the first single-control mode until the input terminates including preventing the second type of modification of the image of the 3D region until liftoff of the one or more contacts included in the input has been detected; and,
      in accordance with a determination, based on the characteristics of the initial portion of the input, that the input has not been recognized as any single gesture:
        entering a first multi-control mode that is associated with a first plurality of different gestures, and
        modifying the image of the 3D region in the first multi-control mode until the input terminates including permitting modification of the image of the 3D region using the two or more types of modifications of the image of the 3D region including the second type of modification of the image of the 3D region until liftoff of the one or more contacts included in the input has been detected.

2. The method of claim 1, wherein the plurality of modes includes:
  a single-control mode wherein the image is modified by modifying a tilt angle of the image relative to a base plane;
  a single-control mode wherein the image is modified by laterally shifting a field of view across a viewing plane;
  a single-control mode wherein the image is modified by enlarging or shrinking the image;
  a single-control mode wherein the image is modified by rotating the field of view in the viewing plane; and
  a multi-control mode wherein the image is modifiable by a combination of the modifications associated with the tilt mode, the pan mode, and the zoom mode.

3. The method of claim 1, wherein the image of the 3D region comprises a map or a CAD object.

4. The method of claim 1, wherein:
  determining the manipulation mode includes comparing the initial portion of the input to respective criteria for gestures, in a second plurality of different gestures, that are associated with corresponding single-control modes; and
  entering the first multi-control mode includes selecting two or more of the gestures in the second plurality of different gestures that most closely match the initial portion of the input, while excluding one or more gestures in the second plurality of different gestures that do not match the initial portion of the input as closely.

5. The method of claim 1, wherein the plurality of modes includes:
  a single-control mode that only allows zooming of the image of the 3D region during the remainder of the input;
  a single-control mode that only allows rotation of the 3D region during the remainder of the input; and
  a multi-control mode that allows simultaneous zooming and rotation of the 3D region during the remainder of the input.

6. An electronic device, comprising:
  a display;
  touch-sensitive surface;
  one or more processors;
  memory; and
  one or more programs, wherein the one or more programs are stored in the memory and configured to be executed by the one or more processors, the one or more programs including instructions for:
    displaying, on the display, an image of a 3D region;
    detecting an initial portion of an input on the touch-sensitive surface, the initial portion of the input having characteristics including:
      one or more contacts; and
      an initial motion of at least one of the one or more contacts;
    while continuing to detect the input and prior to detecting a termination of the input, wherein termination of the input is detected based on liftoff of the one or more contacts included in the input:
      determining, based on the characteristics of the initial portion of the input, a manipulation mode, wherein:
        the manipulation mode is determined from a plurality of modes including at least one single-control mode and at least one multi-control mode;
        a respective single-control mode allows a single first type of modification to the image of the 3D region at a time during a remainder of the input, and
        a respective multi-control mode allows two or more types of modifications of the image of the 3D region simultaneously during the remainder of the input including a second type of modification of the image of the 3D region that is different from the first type of modification of the image of the 3D region;

in accordance with a determination, based on the characteristics of the initial portion of the input, that the input has been recognized as a first gesture:

entering a first single-control mode that is associated specifically with the first gesture, and modifying the image of the 3D region in the first single-control mode until the input terminates including preventing the second type of modification of the image of the 3D region until liftoff of the one or more contacts included in the input has been detected; and, in accordance with a determination, based on the characteristics of the initial portion of the input, that the input has not been recognized as any single gesture:

entering a first multi-control mode that is associated with a first plurality of different gestures, and modifying the image of the 3D region in the first multi-control mode until the input terminates including permitting modification of the image of the 3D region using the two or more types of modifications of the image of the 3D region including the second type of modification of the image of the 3D region until liftoff of the one or more contacts included in the input has been detected.

7. The device of claim 6, wherein the plurality of modes includes:

a single-control mode wherein the image is modified by modifying a tilt angle of the image relative to a base plane;

a single-control mode wherein the image is modified by laterally shifting a field of view across a viewing plane;

a single-control mode wherein the image is modified by enlarging or shrinking the image;

a single-control mode wherein the image is modified by rotating the field of view in the viewing plane; and a multi-control mode wherein the image is modifiable by a combination of the modifications associated with the tilt mode, the pan mode, and the zoom mode.

8. The device of claim 6, wherein the image of the 3D region comprises a map or a CAD object.

9. The device of claim 6, wherein:

determining the manipulation mode includes comparing the initial portion of the input to respective criteria for gestures, in a second plurality of different gestures, that are associated with corresponding single-control modes; and entering the first multi-control mode includes selecting two or more of the gestures in the second plurality of different gestures that most closely match the initial portion of the input, while excluding one or more gestures in the second plurality of different gestures that do not match the initial portion of the input as closely.

10. The device of claim 6, wherein the plurality of modes includes:

a single-control mode that only allows zooming of the image of the 3D region during the remainder of the input;

a single-control mode that only allows rotation of the 3D region during the remainder of the input; and a multi-control mode that allows simultaneous zooming and rotation of the 3D region during the remainder of the input.

11. A non-transitory computer readable storage medium storing one or more programs, the one or more programs comprising instructions, which when executed by an electronic device with a display and a touch-sensitive surface, cause the electronic device to:

display, on the display, an image of a 3D region;

detect an initial portion of an input on the touch-sensitive surface, the initial portion of the input having characteristics including:

one or more contacts; and an initial motion of at least one of the one or more contacts;

while continuing to detect the input and prior to detecting a termination of the input, wherein termination of the input is detected based on liftoff of the one or more contacts included in the input:

determine, based on the characteristics of the initial portion of the input, a manipulation mode, wherein:

the manipulation mode is determined from a plurality of modes including at least one single-control mode and at least one multi-control mode;

a respective single-control mode allows a single first type of modification to the image of the 3D region at a time during a remainder of the input, and a respective multi-control mode allows two or more types of modifications of the image of the 3D region simultaneously during the remainder of the input including a second type of modification of the image of the 3D region that is different from the first type of modification of the image of the 3D region;

in accordance with a determination, based on the characteristics of the initial portion of the input, that the input has been recognized as a first gesture:

enter a first single-control mode that is associated specifically with the first gesture, and modify the image of the 3D region in the first single-control mode until the input terminates including preventing the second type of modification of the image of the 3D region until liftoff of the one or more contacts included in the input has been detected; and, in accordance with a determination, based on the characteristics of the initial portion of the input, that the input has not been recognized as any single gesture:

enter a first multi-control mode that is associated with a first plurality of different gestures, and modify the image of the 3D region in the first multi-control mode until the input terminates including permitting modification of the image of the 3D region using the two or more types of modifications of the image of the 3D region including the second type of modification of the image of the 3D region until liftoff of the one or more contacts included in the input has been detected.

12. The computer readable storage medium of claim 11, wherein the plurality of modes includes:

a single-control mode wherein the image is modified by modifying a tilt angle of the image relative to a base plane;

a single-control mode wherein the image is modified by laterally shifting a field of view across a viewing plane;

a single-control mode wherein the image is modified by enlarging or shrinking the image;

a single-control mode wherein the image is modified by rotating the field of view in the viewing plane; and a multi-control mode wherein the image is modifiable by a combination of the modifications associated with the tilt mode, the pan mode, and the zoom mode.

13. The computer readable storage medium of claim 11, wherein the image of the 3D region comprises a map or a CAD object.

14. The computer readable storage medium of claim 11, wherein:

determining the manipulation mode includes comparing the initial portion of the input to respective criteria for gestures, in a second plurality of different gestures, that are associated with corresponding single-control modes; and entering the first multi-control mode includes selecting two or more of the gestures in the second plurality of different gestures that most closely match the initial portion of the input, while excluding one or more gestures in the second plurality of different gestures that do not match the initial portion of the input as closely.

15. The computer readable storage medium of claim 11, wherein the plurality of modes includes:

a single-control mode that only allows zooming of the image of the 3D region during the remainder of the input;

a single-control mode that only allows rotation of the 3D region during the remainder of the input; and a multi-control mode that allows simultaneous zooming and rotation of the 3D region during the remainder of the input.

* * * * *